(12) United States Patent
Ogasawara

(10) Patent No.: US 11,710,289 B2
(45) Date of Patent: Jul. 25, 2023

(54) INFORMATION PROCESSING APPARATUS, INFORMATION PROCESSING SYSTEM, AND MATERIAL IDENTIFICATION METHOD

(71) Applicant: SONY INTERACTIVE ENTERTAINMENT INC., Tokyo (JP)

(72) Inventor: Hidehiko Ogasawara, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 340 days.

(21) Appl. No.: 16/623,944

(22) PCT Filed: Jun. 29, 2017

(86) PCT No.: PCT/JP2017/023947
§ 371 (c)(1),
(2) Date: Dec. 18, 2019

(87) PCT Pub. No.: WO2019/003384
PCT Pub. Date: Jan. 3, 2019

(65) Prior Publication Data
US 2020/0175297 A1    Jun. 4, 2020

(51) Int. Cl.
*G06V 10/141*  (2022.01)
*G06T 7/521*  (2017.01)
*H04N 23/56*  (2023.01)

(52) U.S. Cl.
CPC ............ *G06V 10/141* (2022.01); *G06T 7/521* (2017.01); *H04N 23/56* (2023.01);
(Continued)

(58) Field of Classification Search
None
See application file for complete search history.

(56) References Cited

U.S. PATENT DOCUMENTS 9,025,027 B2 * 5/2015 Xue .................. G01J 3/0229
                                                  348/148
2012/0262715 A1 * 10/2012 Sakai ................ G01L 1/241
                                                  356/369
(Continued)

FOREIGN PATENT DOCUMENTS

EP      0999518 A1    5/2000
JP    2011-002718 A    1/2011
(Continued)

OTHER PUBLICATIONS

International Search Report dated Sep. 19, 2017, from International Application No. PCT/JP2017/023947, 10 sheets.
(Continued)

*Primary Examiner* — Chikaodili E Anyikire
(74) *Attorney, Agent, or Firm* — Katten Muchin Rosenman LLP

(57) ABSTRACT

An information processing apparatus includes an imaging apparatus that irradiates reference light in a predetermined wavelength band to a subject and captures reflection of the reference light from the subject to acquire data of captured images including a polarized image in multiple bearings (S30). Based on the polarized image, the imaging apparatus acquires a polarization degree image representing a distribution of polarization degrees (S32). The imaging apparatus extracts a region whose polarization degree falls within a predetermined range of polarization degrees as an image of the subject having a predetermined material (S34). The imaging apparatus performs relevant processing on the subject image to generate output data and outputs the generated data (S36).

9 Claims, 14 Drawing Sheets

(52) U.S. Cl.
CPC ............... *G06T 2207/10012* (2013.01); *G06T 2207/10028* (2013.01); *G06T 2207/10048* (2013.01); *G06T 2207/30196* (2013.01)

(56) References Cited

U.S. PATENT DOCUMENTS

| | | | |
|---|---|---|---|
| 2013/0123985 A1* | 5/2013 | Hirai | G01N 21/21 700/259 |
| 2014/0184800 A1* | 7/2014 | Hirai | B60R 1/00 348/148 |
| 2014/0300897 A1* | 10/2014 | Treado | G01J 3/0224 356/364 |
| 2014/0303463 A1* | 10/2014 | Robinson | G01J 3/0262 600/316 |
| 2016/0267348 A1* | 9/2016 | Kondo | G06K 9/4671 |
| 2020/0175297 A1* | 6/2020 | Ogasawara | G06T 7/521 |

FOREIGN PATENT DOCUMENTS

| | | |
|---|---|---|
| JP | 2011-164061 A | 8/2011 |
| JP | 2012-004984 A | 1/2012 |
| JP | 2012-80065 A | 4/2012 |
| JP | 2013-031054 A | 2/2013 |
| JP | 2015-115041 A | 6/2015 |
| WO | 2017/056821 A1 | 4/2017 |

OTHER PUBLICATIONS

Yoichi Sato, "Inverse rendering: reconstructing optical information from images," http://www.mtl.t.u-tokyo.ac.jp/~katsu-t/ssii05-ysato.pdf).
Iwaguchi et al., Research Report on Computer Vision and Image Media, 2016, CVIM-203, vol. 12, p. 1-7.
International Preliminary Report on Patentability dated Jan. 9, 2020, from International Application No. PCT/JP2017/023947, 17 sheets.

* cited by examiner (a)  (b)

FIG.13
(a) 
(b) 
(c) 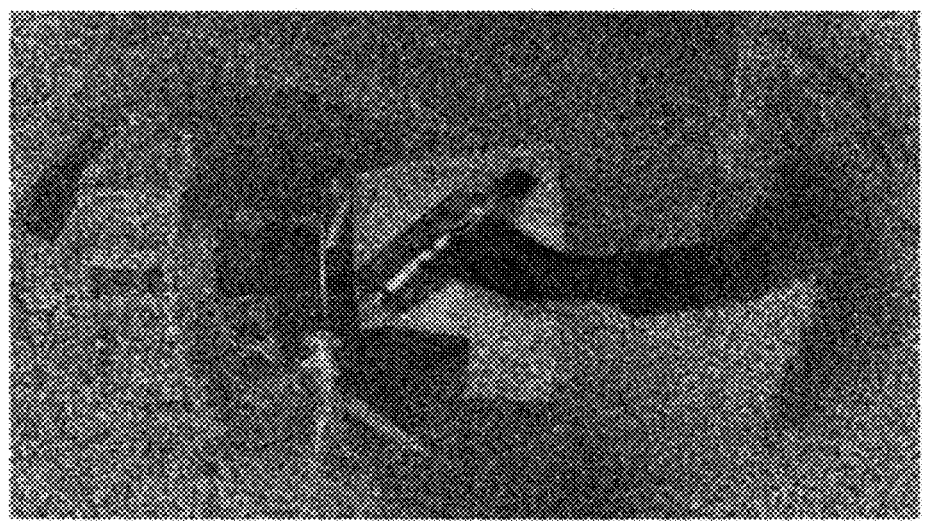

INFORMATION PROCESSING APPARATUS, INFORMATION PROCESSING SYSTEM, AND MATERIAL IDENTIFICATION METHOD

TECHNICAL FIELD

The present invention relates to an information processing apparatus and an information processing system for recognizing the state of a target object using a captured image, as well as to a method for identifying the material of the target object.

BACKGROUND ART

There are known games that involve capturing a portion of a user such as the head with a video camera and, from the captured image, extracting predetermined regions such as the eyes, mouth and hands of the user and replacing them with other images to produce display images for game use (e.g., see PTL 1). Also known is a user interface that receives the motions of the mouth and hands captured by video camera as the operating instructions for applications. Such techniques for capturing the real world, displaying a virtual world reacting to motions in the captured real world, and utilizing the virtual world for some type of information processing have been employed extensively in fields ranging from small mobile terminals to leisure facilities regardless of their scope.

CITATION LIST

Patent Literature

[PTL 1]
European Published Patent No. EP 0999518

SUMMARY

Technical Problem

One problem with image analysis in which the position and posture of a target object are acquired from captured images is that the accuracy of processing tends to be unstable due to the appearance and position of the target object as well as the imaging environment. Take, for example, the common techniques for using feature points in extracting an image of the target object from the captured image or in utilizing the extracted target image for matching purposes. These techniques tend to suffer from worsening accuracy of processing because there may be few feature points on the target object or because the target object may be far away from the camera so that the apparent size of the object is very small. The more robust the accuracy of processing is desired to be, the finer the granularity of the processing is required to be in terms of space and time, or the more complex the algorithm involved needs to be configured, which leads to a heavier processing load.

The present invention has been made in view of the above circumstances. An object of the invention is therefore to provide techniques for acquiring the state of a target object efficiently and accurately using captured images.

Solution to Problem

According to one embodiment of the present invention, there is provided an information processing apparatus. This information processing apparatus includes: a captured image acquisition section configured to acquire data of a polarized image captured of polarized light in a plurality of bearings, the polarized image being formed by reflection of reference light in a predetermined wavelength band irradiated to a subject; a material identification section configured to acquire a distribution of polarization degrees based on the polarized image so as to identify an image of the subject having a predetermined material on the basis of a range of the distribution; and an output data generation section configured to output data representing the identified image.

According to another embodiment of the present invention, there is provided a material identification method. This material identification method includes the steps of: acquiring data of a polarized image captured of polarized light in a plurality of bearings, the polarized image being formed by reflection of reference light in a predetermined wavelength band irradiated to a subject; acquiring a distribution of polarization degrees based on the polarized image so as to identify an image of the subject having a predetermined material on the basis of a range of the distribution; and outputting data representing the identified image.

Incidentally, if other combinations of the above-outlined composing elements or the above expressions of the present invention are converted between different forms such as a method and an apparatus, they still constitute effective embodiments of this invention.

Advantageous Effect of Invention

According to the present invention, the state of a target object is acquired efficiently and accurately using captured images.

BRIEF DESCRIPTION OF DRAWINGS

FIG. 13 is a schematic diagram depicting polarization degree images generated from a polarized image captured over a wide field of view in the embodiment.

DESCRIPTION OF EMBODIMENTS

Figure 1:
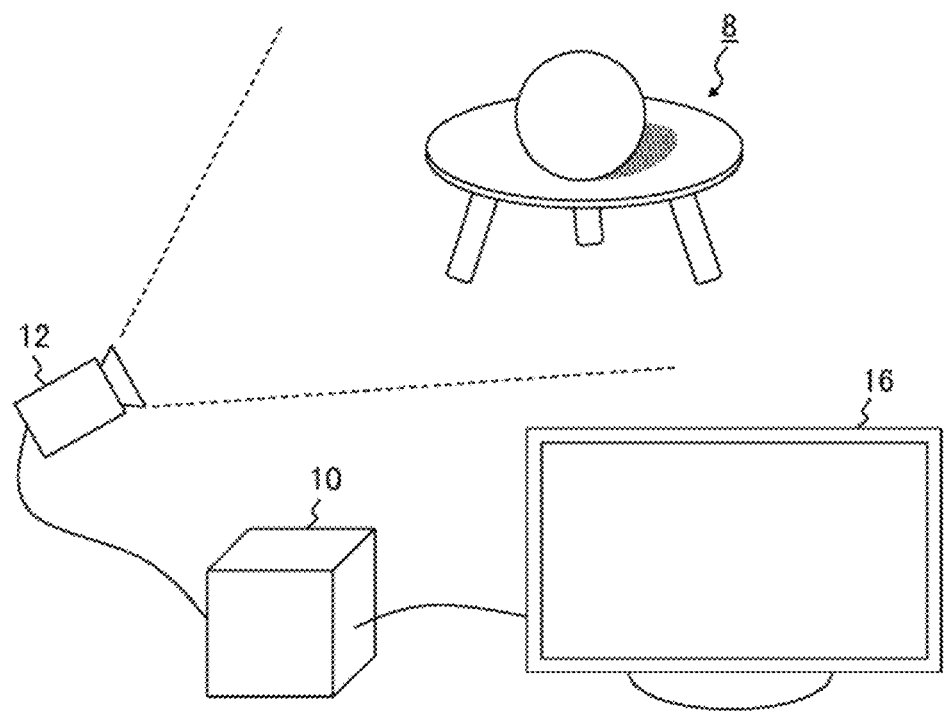
FIG. 1 is a schematic diagram depicting a configuration example of an information processing system embodying the present invention.

FIG. 1 depicts a configuration example of an information processing system embodying the present invention. This information processing system includes an imaging apparatus 12 that captures a subject 8 at a predetermined frame rate, an information processing apparatus 10 that acquires data of the captured image and performs predetermined information processing on the data, and a display apparatus 16 that outputs the result of the information processing. The information processing system may further include an input apparatus that accepts from a user the operations performed on the information processing apparatus 10. Furthermore, the information processing apparatus 10 may be connected with networks such as the Internet in order to communicate with external apparatuses such as servers.

The information processing apparatus 10, imaging apparatus 12, and display apparatus 16 may be interconnected either by cable or in a wireless manner such as via a local area network (LAN). At least two of the information processing apparatus 10, imaging apparatus 12, and display apparatus 16 may be combined to form an integral apparatus. For example, these apparatuses may be mounted on a camera or a mobile terminal to implement an information processing system. Alternatively, the display apparatus 16 may be configured as a head-mounted display that, when worn by the user on the head, projects images in front of the user's eyes. The head-mounted display may be equipped with the imaging apparatus 12 to capture images corresponding to the user's line of sight. In any case, the appearances of the information processing apparatus 10, imaging apparatus 12, and display apparatus 16 are not limited to those illustrated in the drawing.

In the above-described system, the information processing apparatus 10 successively acquires the data of images captured by the imaging apparatus 12 at a predetermined frame rate, and extracts an image of the subject 8 from the captured images. The information processing apparatus 10 further performs information processing on the basis of the result of the extraction to generate display image data and audio data and output the generated data to the display apparatus 16. Here, the content of the information processing carried out by the information processing apparatus 10 based on the result of the image extraction is not limited to anything specific. For example, a predetermined target object included in the subject 8 may be configured as a game controller to be gripped and moved by the user to perform operations on an ongoing game.

In that case, the image representing the game world may be changed in accordance with the motion of the controller, or an image captured of the user in which the controller is replaced with a virtual object may be displayed. As another example, the head-mounted display may be configured to display an image representing a virtual object that interacts with the user's hand in a field of view corresponding to the line of sight of the user wearing the head-mounted display. As a further example, an image region of a specific target object extracted from the captured image may be replaced with a predetermined image, and the image region alone may be processed. The image region, further delimited, may be subjected to more detailed image analysis.

These techniques are required accurately to extract, from the captured image, the image of the subject 8 or the image of a specific target object included in the subject 8. For example, in a target space where there are objects similar in shape to the target object desired to be extracted, their images need to be distinguished and recognized individually. However, the images may be formed in a varied manner due to diverse causes such as the illuminance of the target space, arrangement of lighting fixtures, and colors and patterns of the surface of the target object. The common extraction techniques, based on colors and luminance, may not ensure stable accuracy of extraction.

In view of this, one embodiment of the present invention focuses on the difference in polarization characteristics between materials and associates an image in a polarized image with the original subject based on the material. The embodiment thus implements an image extraction technology resistant to the adverse effects of apparent variations contingent on the surrounding environment. Identification of the material is also useful in addition to extracting the image of the subject. For example, even if the target object is found only partially in a captured image, identifying the material of the target object makes it possible to recognize that the target object is in the field of view. Since an object in the real space is identified on the basis of its material, the technology can be used in article inspection and for control of robot operations in the factory, for example. The information processing apparatus 10 may be configured to perform any of such controls and operations. In practicing the embodiment, the imaging apparatus 12 captures at least a polarized image of the target space.

Figure 2:
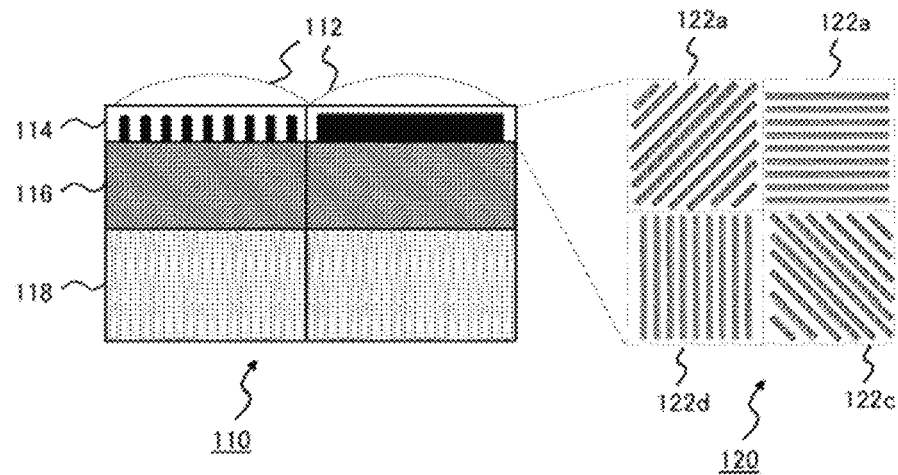
FIG. 2 is a schematic diagram depicting a configuration example of an imaging element incorporated in an imaging apparatus of the embodiment.

FIG. 2 depicts a configuration example of an imaging element incorporated in the imaging apparatus 12. This drawing schematically depicts a cross-sectional functional configuration of the imaging element and omits its detailed structure such as interlayer insulating films and wiring. The imaging element 110 includes a microlens layer 112, a wire grid type polarizer layer 114, a color filter layer 116, and a light detection layer 118. The wire grid type polarizer layer 114 includes polarizers each constituted by multiple linear conductive members arranged in stripes at intervals of a distance shorter than the wavelength of incident light. When the light condensed by the microlens layer 112 enters the wire grid type polarizer layer 114, the polarization components oriented in parallel with the polarizer lines are reflected, with only the polarization components normal thereto being transmitted therethrough.

A polarized image is acquired by the light detection layer 118 detecting the transmitted polarization components. The light detection layer 118 has a semiconductor device structure of a common charge coupled device (CCD) image sensor or that of a complementary metal oxide semiconductor (CMOS) image sensor. The wire grid type polarizer layer 114 includes an array of polarizers of which the principal axis angles vary in charge read units, i.e., in units of pixels or in larger units, in the light detection layer 118. The right side of FIG. 2 depicts a polarizer array 120 as viewed from the top side of the wire grid type polarizer layer 114.

In FIG. 2, the hatched lines represent conductors (wires) constituting the polarizers. The squares delimited by broken lines each denote a region of polarizers having a single principal axis angle. It is to be noted that the broken lines are not actually formed. In the illustrated example, the polarizers with four principal axis angles are arranged in four regions 122a, 122b, 122c and 122d, in two rows and two columns. In the drawing, the polarizers diagonally positioned to each other have their principal axis angles set perpendicular to each other. The adjacent polarizers have a difference of 45° therebetween. That is, the polarizers are provided with four principal axis angles at intervals of 45°.

Each polarizer transmits the polarization component perpendicular to the wire direction. The light detection layer 118 under the polarizers has four layer regions corresponding to the four polarizer regions 122a, 122b, 122c and 122d, the four layer regions acquiring polarization information in four bearings at intervals of 45°. A predetermined number of arrays of such polarizers with four principal axis angles are arranged vertically and horizontally and connected with peripheral circuits that control the timing of charge read operations. The arrangement thus implements an image sensor that obtains simultaneously four types of polarization information as two-dimensional data.

The imaging element 110 in FIG. 2 has the color filter layer 116 interposed between the wire grid type polarizer layer 114 and the light detection layer 118. The color filter layer 116 includes arrays of filters that separately transmit red light, green light, and blue light corresponding to the pixels involved, for example. The filter arrays provide polarization information separately by color in accordance with the combination of the principal axis angles of the polarizers in the wire grid type polarizer layer 114 above and the colors of the filters in the color filter layer 116 below. That is, the polarization information regarding one color in one bearing is obtained discretely on an image plane. The information thus obtained is interpolated as needed to provide a polarized image in each color in each bearing.

It is also possible to operate on the polarized images in the same color to reproduce an unpolarized color image. The techniques for image acquisition using wire grid type polarizers are disclosed, for example, in Japanese Patent Laid-open No. 2012-80065. It is to be noted, however, that the device configuration of the imaging apparatus 12 of this embodiment is not limited to what is illustrated. For example, whereas the embodiment basically uses polarized luminance images, the color filter layer 116 may be omitted for other purposes where color images are not required. The polarizers are not limited to the wire grid type and may be some other commercially available polarizers such as linear dichroic polarizers. As another configuration example, a polarization plate with a variable principal axis angle may be disposed in front of a common camera.

In this embodiment, a distribution of polarization degrees is obtained from polarized images in multiple bearings for use in identifying a material. The behavior of polarized luminance with respect to bearing is known to vary depending on the posture and material of the subject surface. Thus, the polarization degree may be considered an indicator representative of the behavior. Here, the luminance of the light observed via polarizers varies with respect to their principal axis angle $\theta_{pol}$ as defined by the following mathematical expression:

[Math. 1]

$$I = \frac{I_{max} + I_{min}}{2} + \frac{I_{max} - I_{min}}{2}\cos(2(\theta_{pol} - \phi)) \quad \text{(Exp. 1)}$$

In the above expression, $I_{max}$ and $I_{min}$ denote a maximum value and a minimum value of the observed luminance, respectively, and ω represents polarization phase. As discussed above, when polarized images are obtained with respect to four principal axis angles $\theta_{pol}$, the luminance I of the pixels in the same position satisfies the mathematical expression (1) above with regard to each principal axis angle $\theta_{pol}$. Thus, the values $I_{max}$, $I_{min}$, and ω are obtained by approximating a curve passing through these coordinates (I, $\omega_{pol}$) by a cosine function using the least square method, for example. Using the values $I_{max}$ and $I_{min}$ thus acquired, a polarization degree ρ is obtained by the following mathematical expression:

[Math. 2]

$$\rho = \frac{I_{max} - I_{min}}{I_{max} + I_{min}} \quad \text{(Exp. 2)}$$

When the polarization degree ρ is 1, the observed light is completely polarized light (linearly polarized light), i.e., the light is vibrated in a single given direction. When the polarization degree ρ is 0, the observed light is unpolarized and vibrated isotropically. Depending on varying degrees of the vibration, the polarization degree ρ varies between 0 and 1. According to the dichroic reflection model, the spectrum of reflected light is expressed by a linear sum of the spectrum of specular reflection and that of diffuse reflection. Here, specular reflection is the light regularly reflected from the object surface, and diffuse reflection is the light diffused by the pigment particles making up the object. The ratio of the specular reflection component and diffuse reflection component included in reflected light is also dependent on the material of the object reflecting the light.

Figure 3:
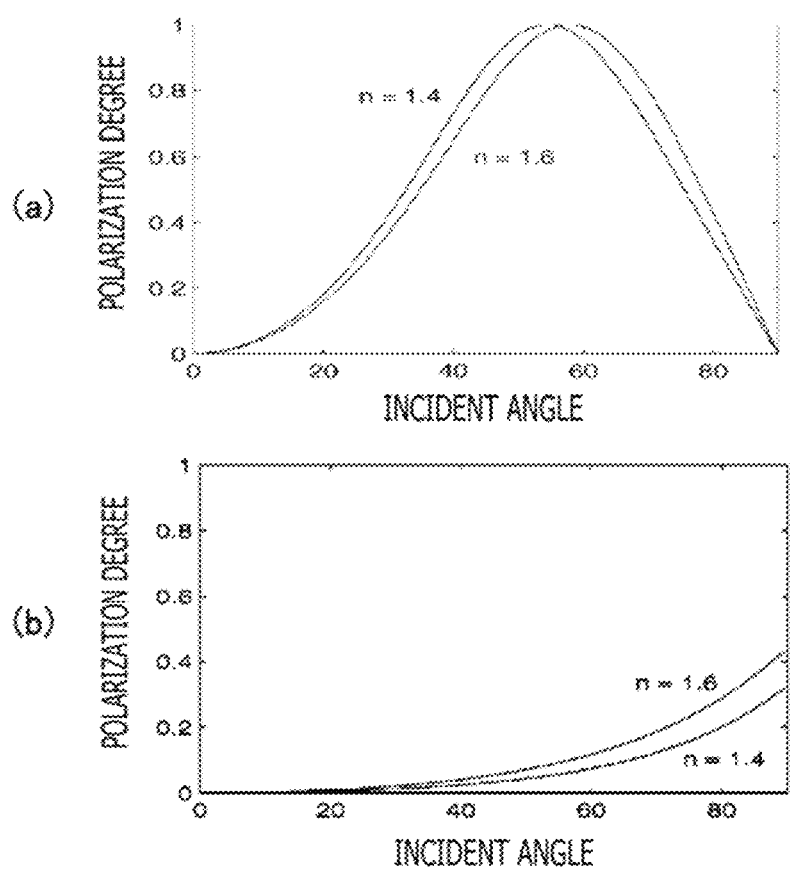
FIG. 3 is a graphic representation comparing changes in polarization degree relative to incident angle between specularly reflected light and diffusely reflected light.

FIG. 3 graphically compares changes in polarization degree relative to incident angle between specularly reflected light and diffusely reflected light. The refractive index n of the reflecting material is assumed to be 1.4 and 1.6. Compared with the specularly reflected light depicted in Subfigure (a), the diffusely reflected light in Subfigure (b) has significantly low polarization degrees over most of the range of incident angles. That is, an image of the subject whose material mostly reflects light diffusely is highly likely to present a low polarization degree. Using this characteristic permits extraction of an image of the object having a predetermined material on the basis of polarization degree. Generally, direct light from a light source is known to be isotropic, i.e., low in polarization degree. Using this characteristic enables distinction between the light from a light source and specularly reflected light stemming therefrom on the basis of polarization degree. By using the characteristic, it is possible to establish the light source in identifying a material using the reflection model, to be discussed later.

Figure 4:
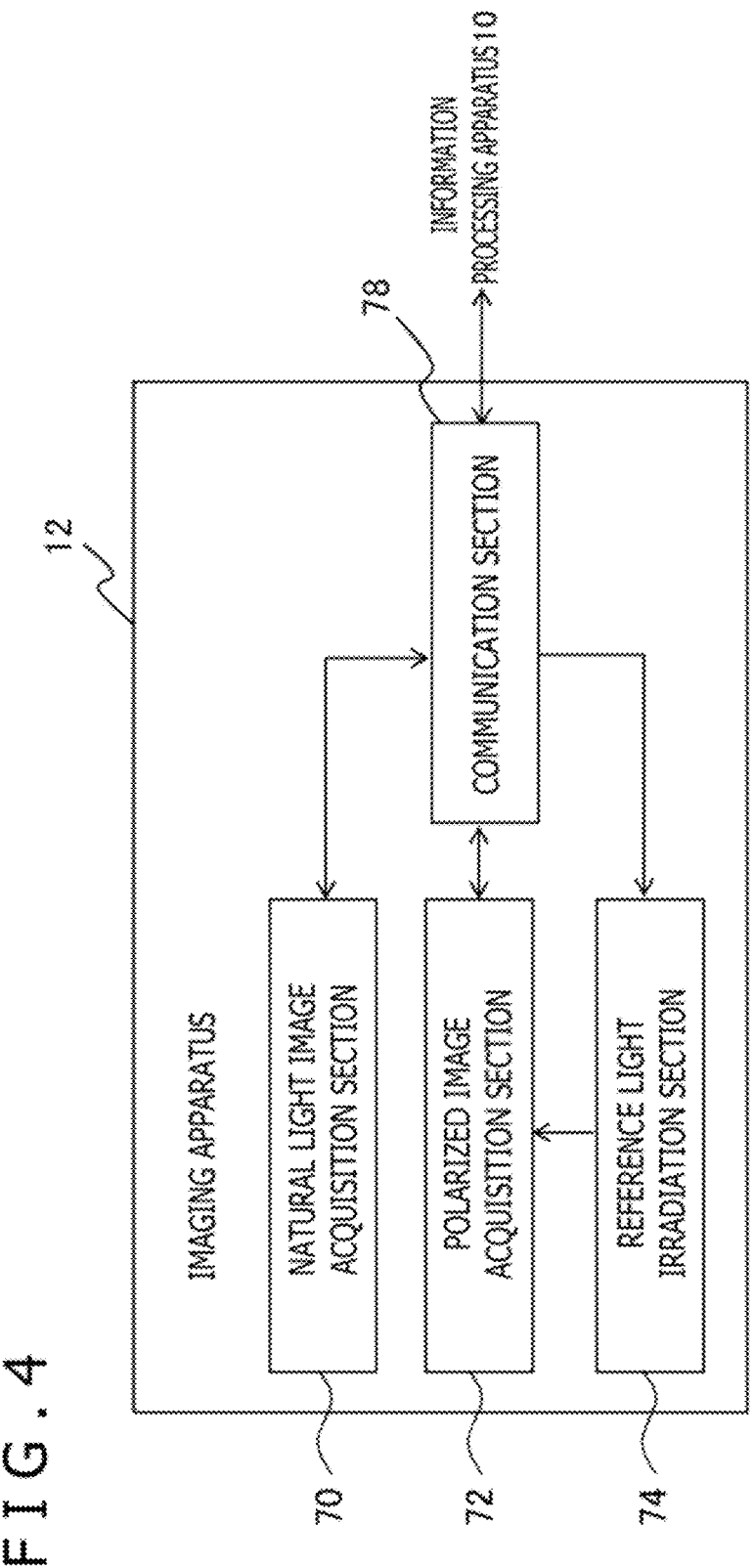
FIG. 4 is a schematic diagram depicting a functional block configuration of the imaging apparatus of the embodiment.

FIG. 4 depicts a functional block configuration of the imaging apparatus 12 of the embodiment. Incidentally, the functional blocks depicted in FIG. 4 as well as in FIGS. 6 and 7, to be discussed later, may be configured by hardware using a microcomputer, a central processing unit (CPU), a graphics processing unit (GPU), memories, data bus, and various sensors, for example, or by software using programs that are typically loaded from recording media into memory to implement such functions as data input, data retention, calculation, image processing, and communication. It will thus be appreciated by those skilled in the art that these functional blocks are implemented by hardware only, by software only, or by a combination thereof in diverse forms and are not limited to any one of such forms.

The imaging apparatus 12 includes a natural light image acquisition section 70, a polarized image acquisition section 72, and a reference light irradiation section 74. The natural light image acquisition section 70 includes an array of imaging elements such as a CCD or a CMOS. The natural light image acquisition section 70 outputs natural light (unpolarized) image data captured by the imaging element array at a predetermined frame rate. The data is used by the information processing apparatus 10 in identifying the position of a light source in a target space or in identifying the relative relationship in position and posture between the target space and an imaging plane, for example.

Preferably, the imaging apparatus 12 is configured as a fish-eye camera capable of capturing an indoor light source such as ceiling illumination. However, in an environment where the light source is within the field of view of a camera with normal lenses, the fish-eye lens is not mandatory. Alternatively, if the position of the light source in the target space is acquired beforehand, it is not necessary to include the light source in the captured image. In order to identify the relative relationship in position and posture between the target space and the imaging plane, the natural light image acquisition section 70 is preferably configured as a stereo camera that captures the target space from right and left viewpoints a predetermined distance apart. Depending on the content of the processing performed by the information processing apparatus 10, the natural light image acquisition section 70 may output solely luminance image data excluding color information.

The polarized image acquisition section 72 includes an array of imaging elements for detecting polarized light in four bearings as depicted in FIG. 2. The polarized image acquisition section 72 thus outputs the data of polarized images in four bearings captured by the imaging element array at a predetermined frame rate. Because an unpolarized luminance image can be generated by averaging the detected values of polarized light in four bearings, the polarized image acquisition section 72 may double as the natural light image acquisition section 70. In this case, the polarized image acquisition section 72 may include a feature for generating an unpolarized light luminance image from polarized images. This feature may be included alternatively in the information processing apparatus 10. The polarized image acquisition section 72 may be configured as a stereo camera. As a further alternative, the natural light image acquisition section 70 and the polarized image acquisition section 72 may be configured to be a stereo camera.

The reference light irradiation section 74 irradiates reference light in a predetermined wavelength band to the target space. The reference light to be selected here is light in a wavelength band that is readily absorbed by the material desired to be detected. In this embodiment, the light absorbed temporarily by the subject surface may be reflected irregularly from inside to produce diffuse reflection. Such diffuse reflection is generated intentionally by suitably selecting the wavelength band of the irradiated light. By taking advantage of the fact that diffuse reflection has a low polarization degree, an image of the subject having the target material to be detected is identified on the basis of polarization degree. Typically, an image of a portion of the exposed human skin such as a hand is identified under infrared irradiation. Whereas the ensuing description assumes that the reference light is infrared rays, this is not intended to limit the wavelength band to that of infrared rays.

The reference light irradiation section 74 may irradiate infrared rays either constantly or only at a necessary timing. When the polarized image acquisition section 72 notifies the polarized image acquisition section 72 of the timing of infrared irradiation, the polarized image acquisition section 72 outputs the data of polarized images captured under infrared irradiation in a manner distinct from the data of images captured during periods not under infrared irradiation, by furnishing the polarized image data from infrared irradiation with additional information indicative of the irradiation. Incidentally, the technique for deriving the distance to a subject by measuring the time from the time of infrared irradiation until detection of the reflected light from the irradiated subject is known as the time of flight (TOF) technique. Although this embodiment utilizes infrared rays for identifying the material of the subject as described above, a separate infrared ray camera may be alternatively provided to detect the infrared wavelength band in order to simultaneously acquire the distance to the subject by TOF.

By establishing communication with the information processing apparatus 10, a communication section 78 outputs successively to the information processing apparatus 10 the data of captured natural light images output from the natural light image acquisition section 70 as well as the data of polarized images in four bearings output from the polarized image acquisition section 72. Also, the communication section 78 acquires from the information processing apparatus 10 types of necessary data and information regarding the timing of infrared irradiation, and notifies the natural light image acquisition section 70, polarized image acquisition section 72, and reference light irradiation section 74 thereof as needed.

Figure 5:
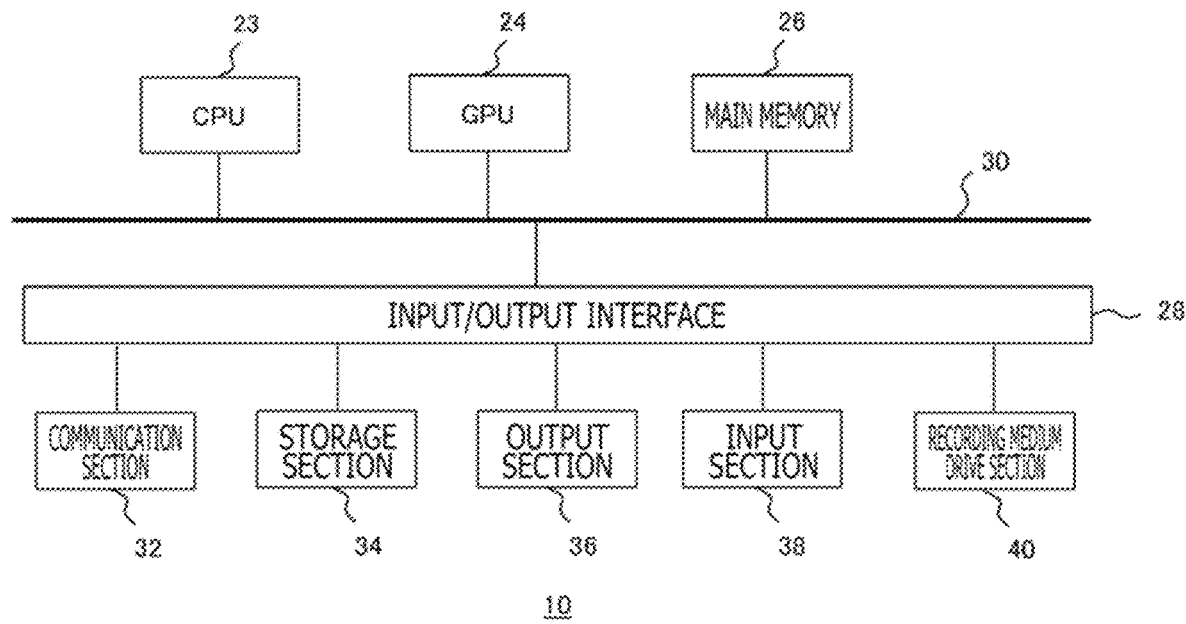
FIG. 5 is a schematic diagram depicting an internal circuit configuration of an information processing apparatus of the embodiment.

FIG. 5 depicts an internal circuit configuration of the information processing apparatus 10. The information processing apparatus 10 includes a CPU 23, a GPU 24, and a main memory 26. These components are interconnected via a bus 30. The bus 30 is further connected with an input/output interface 28. The input/output interface 28 is connected with a peripheral device interface such as a universal serial bus (USB) and IEEE1394 ports, a communication section 32 constituted by a wired or wireless LAN interface, a storage section 34 such as a hard disk drive or a nonvolatile memory, an output section 36 that outputs data to the display apparatus 16, an input section 38 that receives input of data from the imaging apparatus 12 or from an input apparatus, not depicted, and a recording medium drive section 40 that drives a removable recording medium such as a magnetic disk, an optical disk, or a semiconductor memory.

The CPU 23 controls the information processing apparatus 10 as a whole by executing an operating system stored in the storage section 34. The CPU 23 also executes various programs loaded into the main memory 26 after being read from the removable recording medium or downloaded via the communication section 32. The GPU 24 has the functions of both a geometry engine and a rendering processor. In accordance with rendering instructions from the CPU 23, the GPU 24 performs rendering processes and stores display image data into a frame buffer, not depicted. The GPU 24 further converts the display image stored in the frame buffer into a video signal for output to the output section 36. The main memory 26 includes a random access memory (RAM) that stores programs and data necessary for processing.

Figure 6:
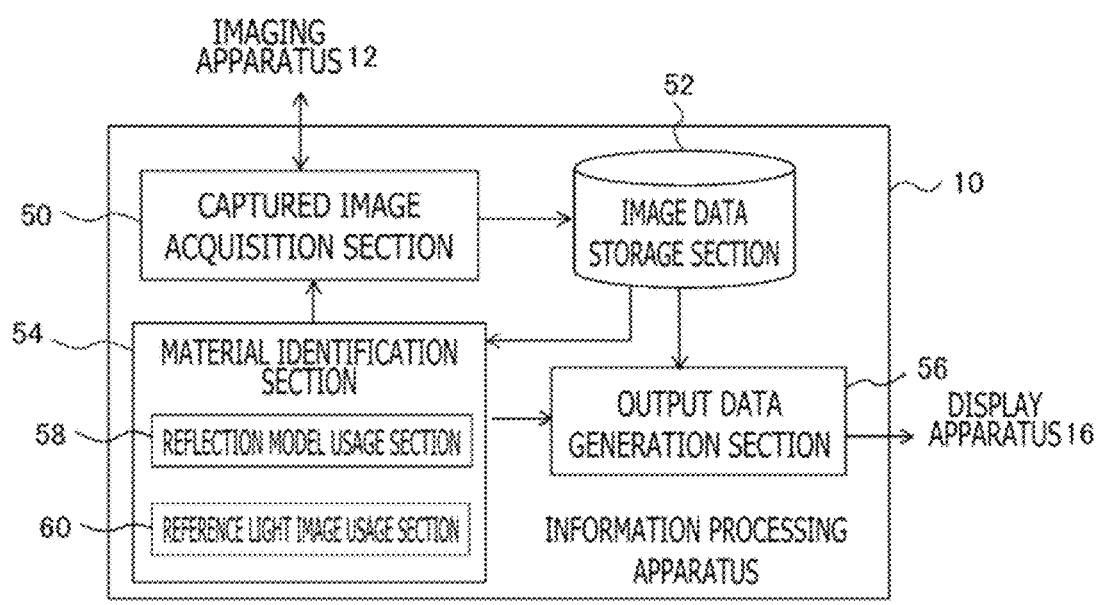
FIG. 6 is a schematic diagram depicting a functional block configuration of the information processing apparatus of the embodiment.

FIG. 6 depicts a functional block configuration of the information processing apparatus 10 of the embodiment. The information processing apparatus 10 includes a captured image acquisition section 50 that acquires the data of captured images from the imaging apparatus 12, an image data storage section 52 that stores the data of acquired images, a material identification section 54 that identifies the material of a subject found in a captured image, and an output data generation section 56 that performs information processing on the basis of the result of material identification to generate the data to be output.

The captured image acquisition section 50 is implemented using the input section 38 and the CPU 23 in FIG. 5, for example. The captured image acquisition section 50 acquires the data of captured images such as polarized images at a predetermined rate from the imaging apparatus 12. Also, the captured image acquisition section 50 transmits to the imaging apparatus 12 requests as to the required type of captured images and the timing of infrared irradiation in accordance with the result of identification made by the material identification section 54, for example. The image data storage section 52 is implemented using the main memory 26. The image data storage section 52 successively stores the data of captured images acquired by the captured image acquisition section 50. At this point, as needed, the captured image acquisition section 50 may generate luminance images from natural light images or from polarized images or may generate and store image data needed in downstream processes.

The material identification section 54 is implemented using the CPU 23 and the GPU 24 in FIG. 5, for example. The material identification section 54 acquires at a predetermined rate the material of the subject included in captured images using the data stored in the image data storage section 52. More specifically, the material identification section 54 includes a reflection model usage section 58 and a reference light image usage section 60, each serving to identify the material of the subject using a different method. Since the two sections have an independent function each, the material identification section 54 may include either of the two sections or may accommodate both sections to improve the accuracy of material identification.

The reflection model usage section 58 identifies the material by solving the inverse problems of a rendering equation commonly used in computer graphics rendering. That is, the material of the subject is identified from the viewpoint of how the light from a light source should be reflected by the subject surface so as to obtain the luminance observed as a captured image. For that purpose, the reflection model usage section 58 acquires the positional relationship among the subject in the real space, the imaging plane of the imaging apparatus 12, and the light source. On the basis of the positional relationship and the luminance of each of the pixels constituting the captured image, the reflection model usage section 58 derives reflection characteristics of the subject surface and identifies the material that provides those reflection characteristics. The processing involved will be discussed later in detail.

Meanwhile, the reference light image usage section 60 acquires a distribution of polarization degrees from polarized images captured under infrared irradiation, and extracts image regions whose polarization degrees are lower than a predetermined threshold value. In the case of a subject that easily absorbs infrared rays as described above, the diffuse reflection component is predominant in the reflected light from the surface of the subject. Because diffuse reflection is significantly lower in polarization degree than specular reflection, the image indicative of a low polarization degree under infrared irradiation is estimated to represent a material having a high rate of infrared ray absorption. On the basis of this principle, an image of a portion of the exposed human skin such as the hand is identified. Specific examples of the processing will be given later.

The output data generation section 56 is implemented using the CPU 23, the GPU 24, and the output section 36 in FIG. 5, for example. The output data generation section 56 generates the data to be output such as display image data and audio data by carrying out predetermined information processing on the basis of the relationship between the image and the material identified by the material identification section 54. As mentioned above, the content of the information processing performed here is not limited to anything specific. When the material of the subject included in the image is identified, the motions of the object made of the known material such as the human hand or the controller may be obtained and used as input information for advancing an electronic game. Alternatively, the output data generation section 56 may implement an augmented reality by reading the data of natural light captured images from the image data storage section 52 and by rendering a virtual object in a manner contacting the target object of a specific material.

This embodiment makes it possible to identify the image of the target object accurately by means of the material of the target object. Thus, the target image alone may be used in order to efficiently obtain the distance to the target object and identify the shape of the target object or changes in the position thereof. Alternatively, the polarized images in four bearings stored in the image data storage section 52 may be used to acquire a distribution of normal vectors on the surface of the target object. There are well-known techniques for obtaining normal vectors of the subject from polarized images. That is, a normal line to the target object surface is expressed by an azimuth angle $\alpha$ indicative of the angle of a light incident plane (emission plane in the case of diffuse reflection) and by a zenith angle $\theta$ indicative of the angle on the surface. The azimuth angle $\alpha$ is the principal axis angle at which the mathematical expression (1) above gives the minimum luminance $I_{min}$ in the case of specular reflection or at which the mathematical expression (1) above gives the maximum luminance $I_{max}$ in the case of diffuse reflection. The zenith angle $\theta$ is related to the polarization degree $\rho_s$ in the case of specular reflection and to the polarization degree $\rho_d$ in the case of diffuse reflection, the relation being defined as follows:

[Math. 3]

$$\rho_s = \frac{2\sin^2\theta \cos\theta \sqrt{n^2 - \sin^2\theta}}{n^2 - \sin^2\theta - n^2 \sin^2\theta + 2\sin^4\theta}$$

$$\rho_d = \frac{(n - 1/n)^2 \sin^2\theta}{2 + 2n^2 - (n + 1/n)^2 \sin^2\theta + 4\cos\theta\sqrt{n^2 - \sin^2\theta}}$$

(Exp. 3)

In the mathematical expression (3) above, n represents the refractive index of the object. The zenith angle θ is obtained by substituting the polarization degree ρ acquired with the expression (2) above into either $\rho_s$ or $\rho_d$ in the expression (3). Given the azimuth angle α and the zenith angle θ thus obtained, a normal vector ($p_x$, $p_y$, $p_z$) is acquired as follows:

[Math. 4]

$$\begin{pmatrix} p_x \\ p_y \\ p_z \end{pmatrix} = \begin{pmatrix} \cos\alpha \cos\theta \\ \sin\alpha \cos\theta \\ \sin\theta \end{pmatrix}$$

(Exp. 4)

In the manner described above, it is possible to acquire, in addition to the overall movement of the target object, fine angle changes and surface-to-surface boundaries with high accuracy and thereby to diversify the game and enhance the accuracy of the augmented reality, for example. The output data generation section 56 transmits the output data such as display images generated in the above-described processing to the display apparatus 16.

Figure 7:
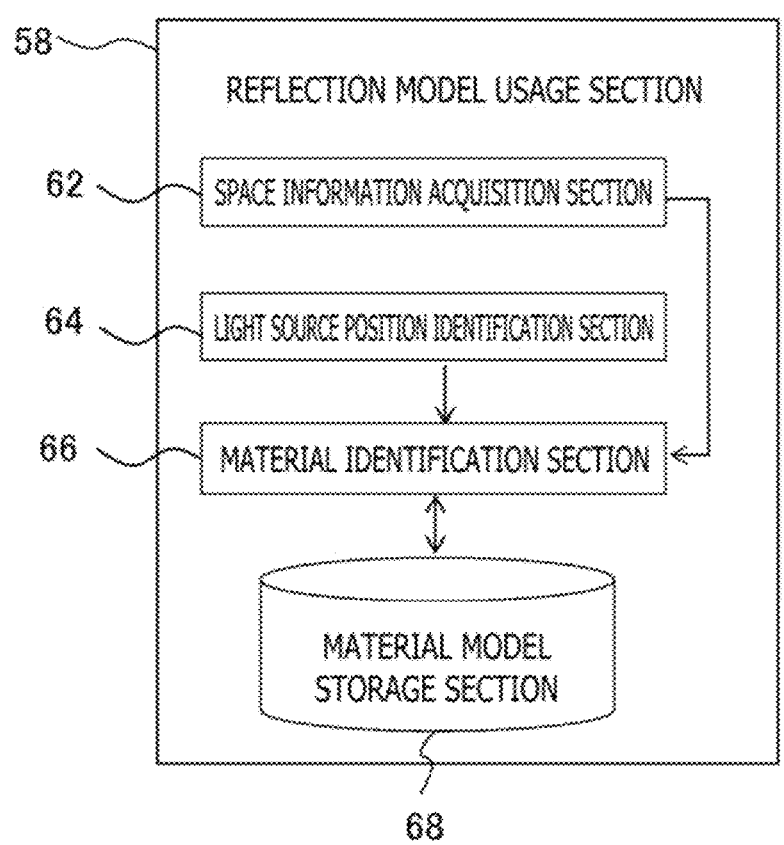
FIG. 7 is a schematic diagram depicting more detailed functional blocks of a reflection model usage section of the embodiment.

FIG. 7 depicts more detailed functional blocks of the reflection model usage section 58. The reflection model usage section 58 includes a space information acquisition section 62, a light source position identification section 64, a material identification section 66, and a material model storage section 68. Using captured images, the space information acquisition section 62 acquires the positional relationship between the subject constituting the three-dimensional real space and the imaging plane of the imaging apparatus 12. The acquired information corresponds to the process of arranging objects inside a world coordinate system in computer graphics and of establishing a camera coordinate system.

For that purpose, the space information acquisition section 62 obtains corresponding points in captured stereoscopic images and acquires the distance from the imaging plane to each subject using the principles of triangulation. The positional relationship between the surface of the subject and the imaging plane is then obtained by inversely projecting the pixels of the captured image to positions in a three-dimensional space corresponding to the distance. In the case where the imaging apparatus 12 is attached to the head-mounted display, the imaging plane is moved relative to the three-dimensional space. In such a case, the techniques of simultaneous localization and mapping (SLAM) are adopted to acquire the configuration of objects in the surroundings (an environmental map) using the captured image and to estimate the position and posture of the imaging plane relative to that configuration. The space information acquisition section 62 may further obtain normal vectors using polarized images in four bearings as described above in order to precisely identify the posture of the subject.

The light source position identification section 64 identifies the position of a light source in the three-dimensional real space. If images are captured using the fish-eye lens, for example, to include the light source within the field of view, the position of the light source is obtained basically in a similar manner as the space information acquisition section 62. However, depending on the imaging environment, specular reflection from a predominantly lustrous surface of the material can be observed with luminance almost as high as that of the light source. In this case, the position emitting the reflection can be falsely recognized as the light source, which will worsen the accuracy of material identification.

In view of this, the light source position identification section 64 distinguishes the image of the light source from the image of reflected light coming therefrom by use of polarization degrees as discussed above. Because high-luminance reflection that tends to be falsely recognized as a light source has a large specular reflection component, comparing the polarization degrees permits easy distinction between the reflection and the isotropic light from the light source. That is, the polarization degrees of light source candidates are first verified from the captured images. Any image with a polarization degree higher than a predetermined threshold value is then determined to be something other than a light source and excluded from the candidates.

In the case where there is a liquid crystal display in the target space, the emission of light from the display screen has a high polarization degree. The light source position identification section 64 then makes a distinction between the image of the liquid crystal display and the image of the reflected light with a large specular reflection component from among the images excluded because of their high polarization degrees as described above. The image of the reflected light with the large specular reflection component has its polarization degree progressively attenuated the farther the position is away from the center of the region formed by specular reflection by the light source such as illumination. By contrast, the light-emitting display has a uniform polarization degree over an entire screen having a relatively wide area. Thus, the light source position identification section 64 distinguishes these images based on the distribution of the polarization degrees in the space.

The material identification section 66 identifies the material of the subject by setting up an equation using the reflection model based on the information regarding the luminance presented by the captured image and on the positional relationship, acquired by the space information acquisition section 62 and the light source position identification section 64, among the subject, the imaging plane, and the light source in the three-dimensional space. Ordinary computer graphics involves arranging the object with reflection characteristics established in a world coordinate system and setting up a light source and a camera coordinate system in order to calculate the distribution of the luminance of reflected light from the object surface. In this case, the following rendering equation is used to obtain the luminance L (r, ω) of light radiated from a point r on the object surface in a direction ω:

[Math. 5]

$$L(r,\omega) = L_e(r,\omega) + \int_{S_2} f_r(r,\omega,\omega_i) L_i(r,\omega_i) \cos\Theta d\omega_i$$

(Exp. 5)

In the above expression, $L_e$(r, ω) denotes the luminance of light emitted by the object itself at the point r. Also in the expression, $f_r$(r, ω, $\omega_i$) represents a bidirectional reflection distribution function (BRDF) indicative of the reflection characteristics of light at the point r. The function thus expresses the ratio of the luminance L(r, ω) of reflected light in the direction ω to the luminance $L_i(r, ω_i)$ of incident light in an incident direction $ω_i$. This function is dependent on the material. Also in the expression, Θ stands for the angle between the bearing of a normal line to the subject surface at the point r and the reflection direction ω of light, and $S_i$ for the range of light incident direction $ω_i$ at the point r. As a result, the luminance L(r, ω) and the image luminance on the captured image representing the point r are determined by the normal line to the point r, by the positional relationship between the light source and the imaging plane, and by the material of the subject.

With the expression (5) above, giving the image luminance value presented by the captured image to the left side of the equation permits acquisition of one of the parameters included in the right side. This technique is called inverse rendering as the inverse problem of graphics rendering. Since the function $f_r$ is actually a four-dimensional function that includes the azimuth angles and zenith angles of incident light and reflected light even on the assumption that the subject has a uniform material, various models have been proposed to represent these parameters succinctly (e.g., see "Inverse rendering: reconstructing optical information from images," Yoichi Sato, http://www.mtl.t.u-tokyo.ac.jp/~katsu-t/ssii05-ysato.pdf).

This embodiment prepares beforehand material models each associating a presumed material of the subject with the function $f_r$ or with the data (reflection characteristic) approximating the function using a predetermined model, and stores the prepared material models into the material model storage section 68. Alternatively, objects of diverse materials may be captured, and alternative parameters of the function $f_r$ may be acquired from the captured image as actually measured data of the reflection characteristic for each material. The material identification section 66 obtains the reflection characteristic by inversely solving the expression (5) above using the information acquired by the space information acquisition section 62 and by the light source position identification section 64 as well as the image luminance values from the captured image. The material identification section 66 then uses the acquired reflection characteristic as an index for referencing the material models.

The closest-matched material is then selected as the material of the subject originating the image. Because the relationship between the image and the subject is determined by the space information acquisition section 62, the material of the subject may be acquired by simply carrying out the above processing one image at a time. Since various models have been proposed for simplifying the rendering equation as mentioned above, suitable models are selected in view of the actually conceivable environment of the target space and the processing performance of the information processing apparatus 10, for example. Incidentally, the first term of the expression (3) above may be omitted because the target whose material is to be identified by this embodiment is something other than a luminous body.

Whereas the above processing uses the luminance in natural light captured images, the luminance of polarized images in four bearings acquired by this embodiment may alternatively be utilized. That is, for each material and for each bearing of polarization, the parameters corresponding to the function $f_r$ are acquired and stored into the material model storage section 68. Given the luminance of each of the polarized images actually obtained in four bearings, the expression (5) above is used to acquire the reflection characteristic for each bearing. The material having the reflection characteristics closest to those thus obtained is then identified. For example, the luminance L(r, ω) of reflected light in the expression (5) above may be represented by the following model as the sum of the diffuse reflection component and specular reflection component in the incident light having the luminance $L_i(r, ω_i)$:

[Math. 6]

$$L(r,ω) = L_i(r,ω_i)k_d \cos α + L_i(r,ω_i)k_s \cos^h(ω-β) \quad \text{(Exp. 6)}$$

The mathematical expression above is well known as Phong's model in the field of computer graphics. It is to be noted that the component of ambient light is omitted. In the expression, a parameter $k_d$ stands for diffuse reflection factor, a parameter $k_s$ for specular reflection factor, and a parameter h for an indicator of the degree of luster unique to the material. These parameters are dependent on the material. Also in the expression above, β denotes the angle between a normal vector and a vector in the light source direction at a position r on the object surface. This angle is obtained on the basis of the positional relationship between the subject and the light source in the three-dimensional space, the positional relationship having been acquired by the space information acquisition section 62 and by the light source position identification section 64. If it is assumed for the expression (7) below that id denotes the luminance of the diffuse reflection component in the first term on the right side and that $i_s$ represents the luminance of the specular reflection component in the second term on the right side, the polarized luminance $I_d(θ_{pol})$ of the diffuse reflection component and the polarized luminance $I_s(θ_{pol})$ of the specular reflection component with respect to the principal axis angle $θ_{pol}$ of polarizers are defined as follows:

[Math. 7]

$$I_d(θ_{pol}) = i_d(1 + ρ_d \cos(2(θ_{pol} - φ)))$$

$$I_s(θ_{pol}) = i_s(1 + ρ_s \cos(2(θ_{pol} - φ))) \quad \text{(Exp. 7)}$$

In the above expression, $ρ_d$ stands for the polarization degree of the diffuse reflection component and $ρ_s$ for the polarization degree of the specular reflection component as defined by the expression (3) above. If the positional relationship between the subject and the light source in the three-dimensional space is assumed to be known, the positional relationship having been acquired by the space information acquisition section 62 and by the light source position identification section 64, these polarization degrees are dependent on the refractive index n and, by extension, on the material. When the expression (7) above is used to add up the parameters between the same principal axis angles $θ_{pol}$=0°, 15°, 30° and 45°, the luminance L(r, ω, $θ_{pol}$) of polarized light in the corresponding bearing is obtained. Thus, if the parameters $k_d$, $k_s$, h, and n are prepared for each material, it is possible to obtain the ratio of the luminance L(r, ω, $θ_{pol}$) of polarized reflected light in the direction ω to the luminance $L_i(r, i)$ of incident light in the incident direction $ω_i$, i.e., the function $f_r$ for each bearing of polarization.

Comparisons are thus made between the function $f_r$ obtained by setting up the expression (5) above for each polarization bearing on one hand, and the function $f_r$ acquired for each material and for each polarization bearing from the parameters $k_d$, $k_s$, h and n stored in the material model storage section 68 and from the positional relationship between the subject and the light source in the three-dimensional space on the other hand. The results of the comparisons are used to select the closest-matched material.

In this case, there are four functions $f_r$ to be compared. Thus, the difference is obtained for each bearing, and the differences are added up so that the material with the smallest of the sums may be selected. Alternatively, the material may be assumed beforehand. The expression (5) above may then be used to obtain the polarized luminance for each bearing, and the material that is closest to the actual polarized image may be selected. In any case, using the polarized luminance in four bearings permits more accurate acquisition of the material in view of the ratio of the polarization components.

As another alternative, a model other than the one defined by the expression (5) above may be adopted, and similar principles may be applied in estimating the material. For example, as a material model, the ratio γ of the diffuse reflection component and the specular reflection component in reflected light is stored in association with each candidate material. In this case, γ denotes a function of the above-mentioned angle β and the reflection direction angle ω. As described above, the spectrum of reflected light is a linear sum of the reflection components in the light. Thus, when the value of γ is determined on the basis of the light source position and of the positions and postures of the subject and the imaging plane, it is possible to acquire the polarization characteristic of incident light entering each pixel of the imaging plane, i.e., changes in polarized luminance with respect to bearing. The acquired results are compared with the changes in polarized luminance obtained with the expression (1) above using actual polarized images. The material with the smallest difference as a result of the comparison may then be identified as the true material. As another alternative, polarized images may be acquired by diversely varying the position of the light source and that of the imaging apparatus. Then the functions $f_r$ and γ may be obtained as actually measured data for each material and for each polarization bearing, the data being stored into the material model storage section 68.

Figure 8:
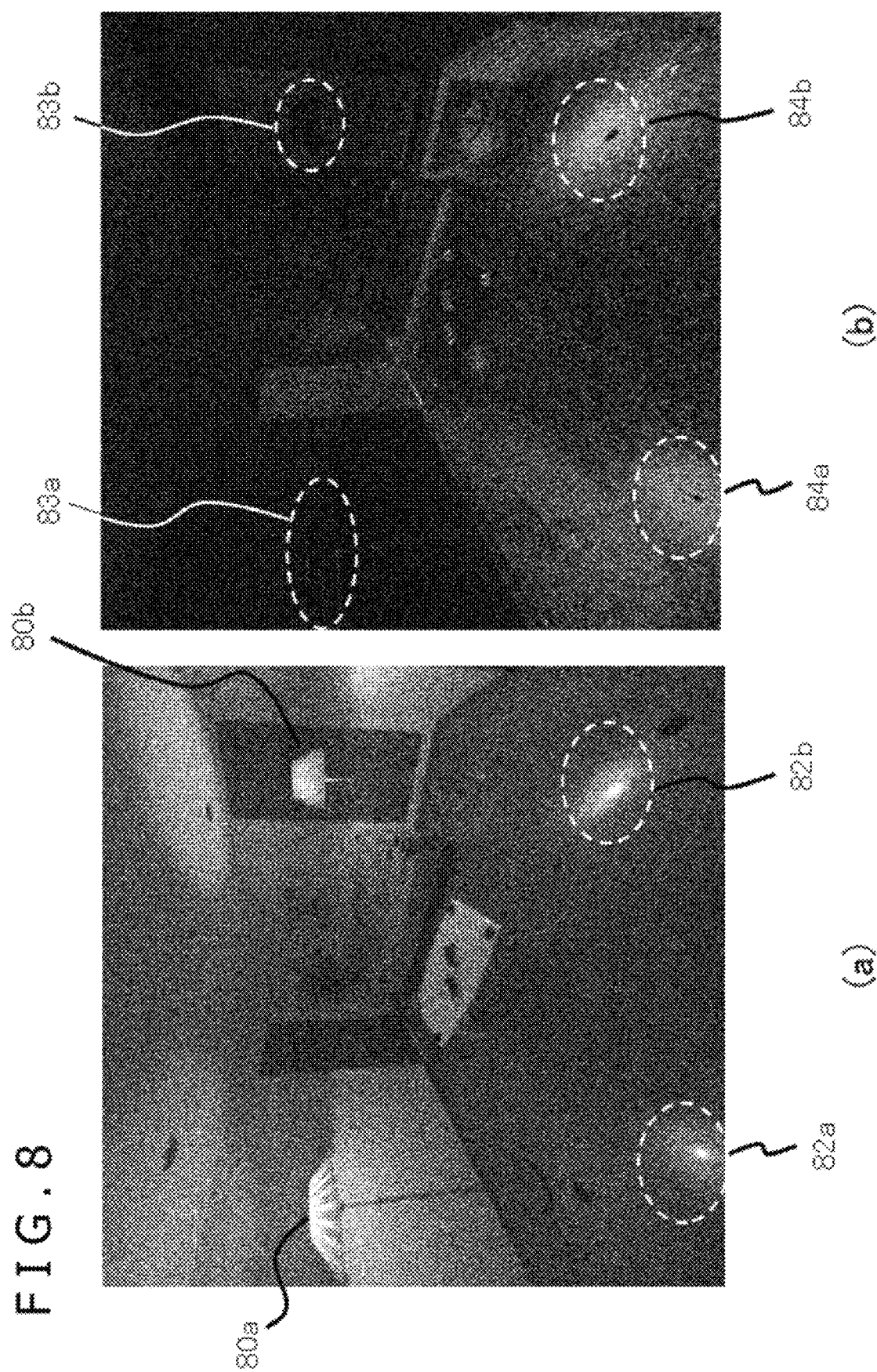
FIG. 8 is an explanatory diagram explaining processing performed by a light source position identification section of the embodiment to identify the position of a light source based on polarization degrees.

FIG. 8 is an explanatory diagram explaining processing steps performed by the light source position identification section 64 to identify the position of a light source based on polarization degrees. Subfigure (a) depicts a natural light luminance image captured of a room interior that includes illumination. In this example, there are two floor lamp illumination images 80a and 80b, along with images 82a and 82b of reflected light from the floor with high luminance. As in the drawing, with respect to a floor and a table that are particularly lustrous, reflected light with almost as much luminance as the illumination can be captured.

Suppose that the position of a light source is set up in the three-dimensional space based on that image and is applied to the rendering equation as discussed above leading to false recognition of the reflected light as a light source. This may well disable correct identification of the material. Distinguishing the light source from reflected light is effective in improving the accuracy not only of the process of material identification but also of diverse cases of information processing, such as where a virtual object is rendered in a manner reflecting an actual light source or where image analysis is performed on the basis of a light source position.

Subfigure (b) depicts a polarization degree image generated from a polarized image corresponding to Subfigure (a). Here, the polarization degree image is an image that uses as its pixel values the polarization degrees calculated by the expression (2) above. The higher the polarization degree of a pixel in Subfigure (b), the higher the luminance of that pixel. As illustrated in Subfigure (b), the specular reflection component is predominant in the reflected light from the floor. Thus, compared with images 83a and 83b of direct light from the floor lamp illumination in which the diffuse reflection component is predominant, images 84a and 84b of reflected light have significantly high polarization degrees. It is to be noted that the centers of the images 84a and 84b of reflected light are rendered black because their polarization degrees exceed an upper limit that can be set for the pixel value.

As described above, even in the case of a reflected light image that is difficult to distinguish from a light source in a natural light luminance image, the reflected light can be easily identified using polarization degrees. Where a camera is mounted on a short robot, the viewpoint of the camera is close to the floor so that the reflected light from the floor tends to enter the field of view of the camera. If the self position is identified by SLAM using images captured in such a field of view, a confusion between the actual illumination and the reflection from the floor can lead to creating an incorrect environmental map or result in a breakdown of processing. The robot can thus be controlled with high accuracy when this embodiment is used to recognize the reflected light as distinct from the light source.

Figure 9:
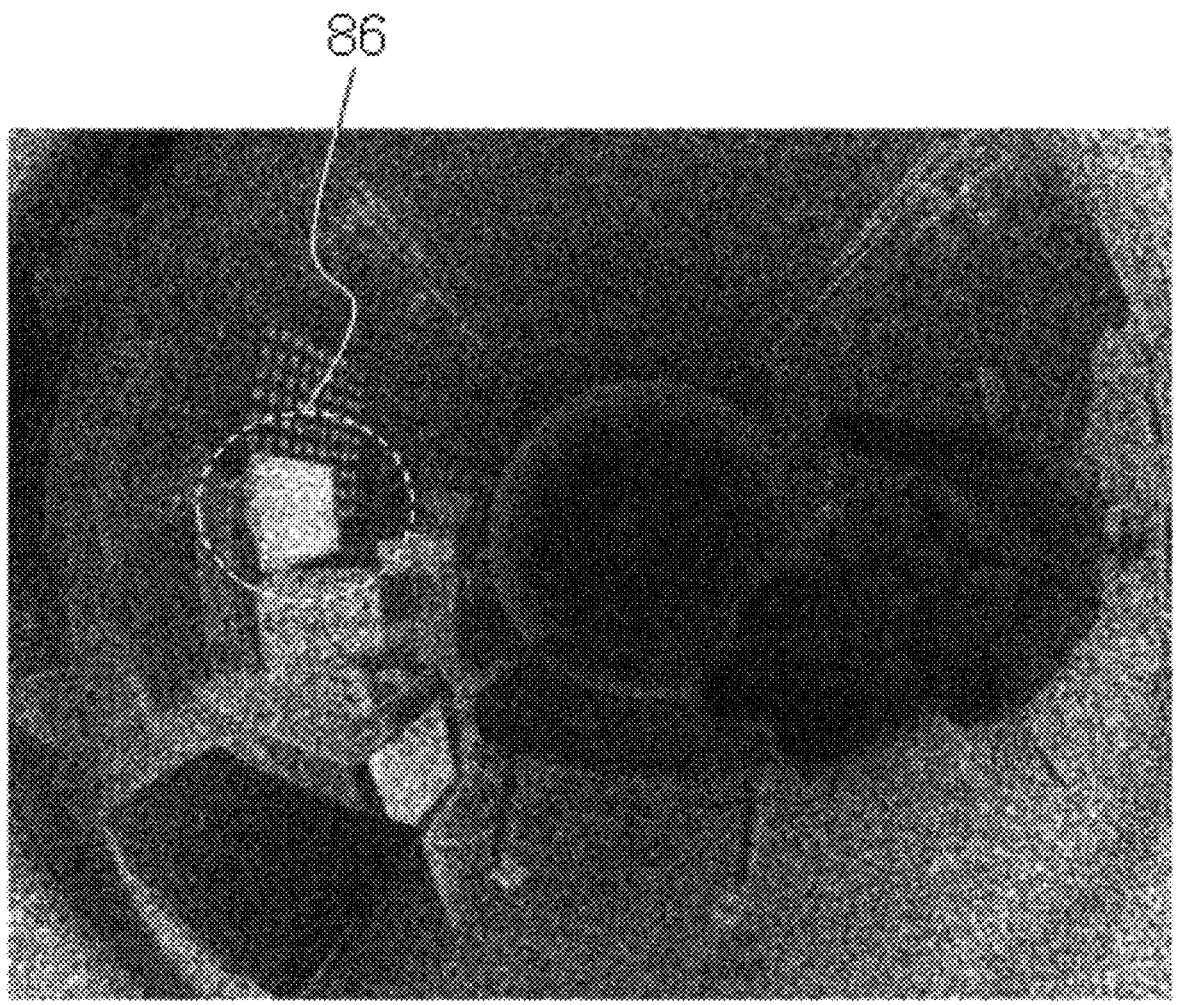
FIG. 9 is a schematic diagram depicting a polarization degree image of a room interior that includes a liquid crystal display of the embodiment.

FIG. 9 depicts a polarization degree image of a room interior that includes a liquid crystal display. As depicted, the emission of light from the liquid crystal display causes an image 86 of the display to have a high polarization degree. This permits easy distinction from a light source as illustrated in FIG. 8. Whereas the entire liquid crystal display has a uniform polarization degree delimiting a clear boundary of the display against the background, each of the images 84a and 84b of reflected light from the floor has the polarization degree that is the highest at the center and progressively attenuated toward the periphery. Using the difference between such spatial distributions of polarization degrees makes it possible to distinguish the reflected light from the liquid crystal display.

Figure 10:
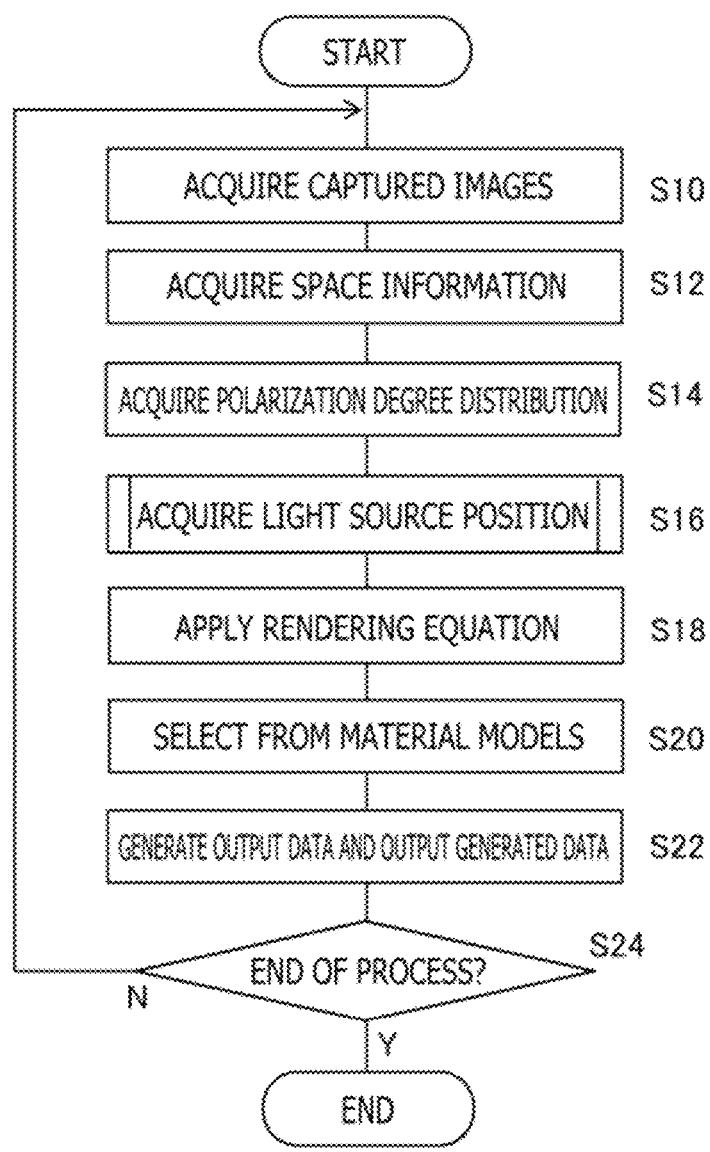
FIG. 10 is a flowchart of processing steps performed by the reflection model usage section in a material identification section of the embodiment to identify a material, generate output data based on the result of the identification, and output the generated data.

The operation of the information processing apparatus 10 is explained next. FIG. 10 is a flowchart of processing steps performed by the reflection model usage section 58 in the material identification section 54 to identify a material, generate output data based on the result of the identification, and output the generated data. The process of this flowchart is started when the user requests the information processing apparatus 10 to start processing and the imaging apparatus 12 starts to capture a target object in response to the request.

First, the captured image acquisition section 50 acquires the data of captured images from the imaging apparatus 12 and stores the captured data into the image data storage section 52 (S10). The data includes polarized images in multiple bearings and natural light luminance images. The data also includes stereoscopic images captured by a stereo camera from right and left viewpoints. The stereoscopic images may be either natural light captured images or polarized images. In the case where the TOF feature is adopted, distance images may be acquired instead of the stereoscopic images. A natural light luminance image may be generated by the information processing apparatus 10 calculating polarized images together.

Then the space information acquisition section 62 in the reflection model usage section 58 acquires, using the stereoscopic images included in the captured images, space information regarding the positional relationship between each subject and the imaging plane in the three-dimensional space (S12). Meanwhile, the light source position identification section 64 acquires, using the polarized images in four bearings, a distribution of polarization degrees such as is depicted in Subfigure (b) of FIG. 8 or in FIG. 9 (S14). The regions whose luminance is equal to or higher than a predetermined threshold value are extracted as light source candidates from the luminance value image. The image of a true light source is then identified on the basis of the polarization degrees of the candidates. The distance to the true light source is obtained using the stereoscopic images. This permits acquisition of the light source position (S16) in the three-dimensional space obtained in S12.

Next, the material identification section 66 derives the function $f_r$ or the data approximating it with a predetermined model by plugging into the rendering equation of the expression (5) above the relations among the subject, imaging plane, and light source position and posture in the three-dimensional space as well as the luminance value of each of the pixels in the luminance image (S18). The material identification section 66 thus identifies the material of each image by selecting the material associated with or closest to the derived data from the material model storage section 68 (S20). As mentioned above, the steps of S18 and S20 may be carried out in image units. Alternatively, these steps may be performed in smaller units such as in pixels and the results may be integrated to select the closest-matched material.

The step of S20 may be replaced with steps in which the function $f_r$ or the data approximating it with a predetermined model is first assumed and plugged into the expression (5) above so as to render an image in a manner similar to that of ordinary rendering processing, the rendered image being compared with the actually captured image to determine whether the assumption is appropriate. In this case, the data to be assumed may be taken from among the data associated with the material candidates and stored in the material model storage section 68. The images rendered by assuming all materials are each compared with the captured image. The material for which the difference between the rendered image and the captured image is the smallest is then identified as the ultimate result of the determination.

The output data generation section 56 then performs predetermined processing based on the acquired material to generate output data such as display image data and audio data, and outputs the generated data to the display apparatus 16 (S22). The processing performed here is not limited to anything specific, as discussed above. That is, for example, a game screen may be rendered by extracting images of the subject having a predetermined material, by identifying the position and motion of the imaged subject, and by performing further image analysis on the region that includes the subject. As another example, objects that are simply in the field of view of the imaging apparatus may be recognized on the basis of their material. Such recognition may be used for article inspection, for example, and the data representative of the result of the recognition may be generated and output. As a further example, control signals for causing a robot to approach and/or grab the objects of a predetermined material may be output to that robot.

During the time period in which there is no need to stop the process by means of, for example, a user operation (N in S24), the steps of S10 to S22 are repeated on subsequent image frames. If it becomes necessary to stop the process by means of the user operation, for example, the entire process is terminated (Y in S24).

Figure 11:
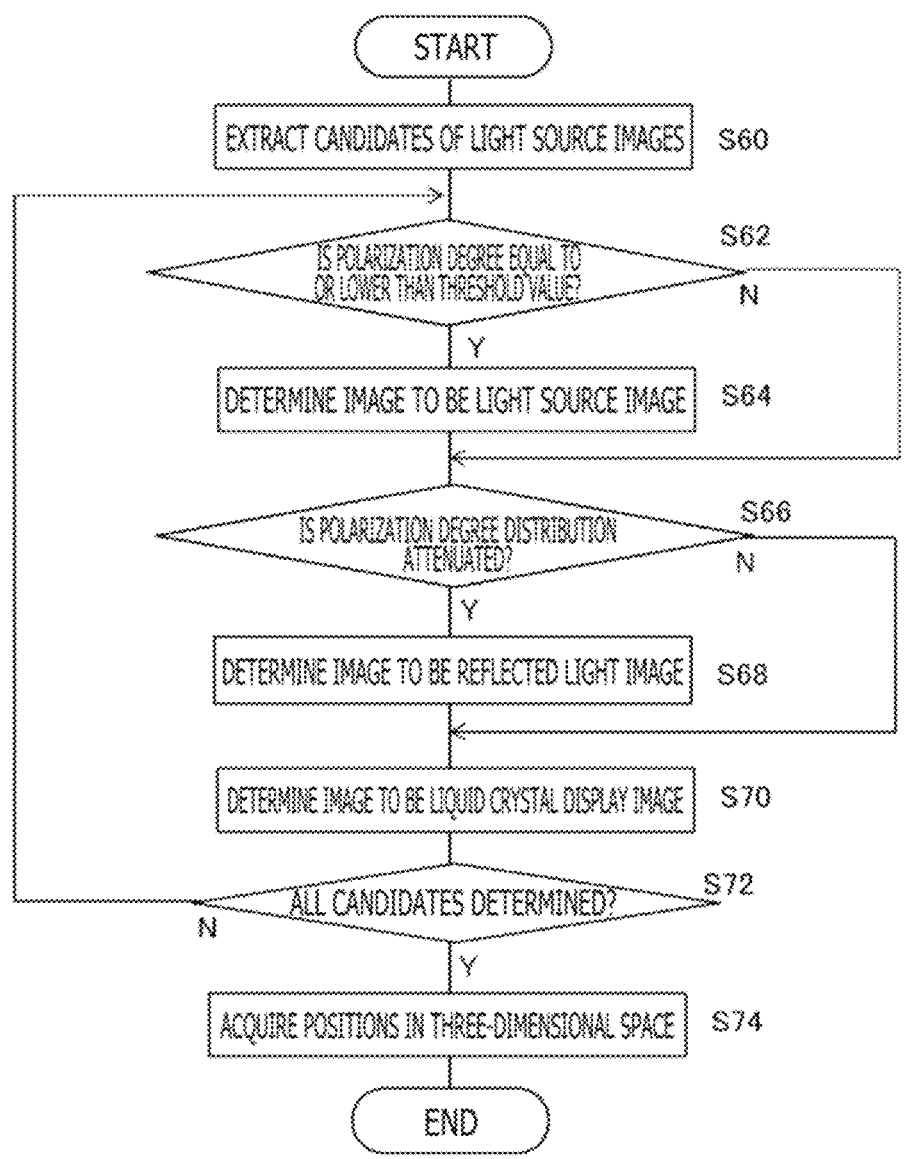
FIG. 11 is a flowchart of more detailed processing steps performed by a light source position identification section 64 in S16 of FIG. 10 to identify the position of a light source.

FIG. 11 is a flowchart of more detailed processing steps performed by the light source position identification section 64 in S16 of FIG. 10 to identify the position of a light source. First, the light source position identification section 64 extracts from the luminance image the images having luminance values equal to or higher than a predetermined threshold value as light source image candidates (S60). The light source position identification section 64 proceeds to verify the polarization degree of each corresponding region in the polarization degree image. When the polarization degree of a light source image candidate is equal to or lower than a predetermined threshold value (Y in S62), that image is determined to be an image of a true light source (S64). When the polarization degree of a candidate image exceeds the threshold value (N in S62) or when the polarization degree is progressively attenuated toward the periphery of the image (Y in S66), that image is determined to be an image of reflected light (S68).

For example, the pixels constituting an image are scanned in the horizontal and vertical directions to acquire a one-dimensional distribution of polarization degrees. The profile of the distribution is used to determine whether or not the polarization degrees of the pixels are attenuated. Alternatively, a histogram and a variance of the polarization degrees of the pixels making up the image are acquired. If the variance turns out to be larger than predetermined, the polarization degrees are determined to be attenuated. There are many other criteria for the determination, as will be understood by those skilled in the art. In the case where the polarization degree is not attenuated, i.e., where the polarization degree is regarded as uniform over the entire image (N in S66), the image is determined to be an image of a liquid crystal display (S70).

Where all the light source image candidates extracted in S60 have yet to be subjected to determination, the determination steps of S62 to S70 are repeated on each image. When all images have been determined (Y in S72), the positions in the three-dimensional space are acquired on the basis of the parallax of the corresponding images in the stereoscopic images (S74). What is acquired here may be the positions of all of such targets as the light source, locations reflecting light from the light source, and the liquid crystal display, or part of these positions such as the light source alone or the light source and the liquid crystal display, depending on subsequent processes to be carried out.

The function of the reference light image usage section 60 in the material identification section 54 is explained next. Using polarized images under infrared irradiation as discussed above, the reference light image usage section 60 identifies images of subjects that easily absorb infrared rays, such as images of exposed skin portions of a person. Near-infrared rays with wavelengths of approximately 700 to 900 nm are known to readily transmit living tissue and are thus used for living tissue imaging. On the other hand, compared with X-rays or ultrasonic waves, infrared rays tend to be diffused by the living tissue. Thus, when reflected light of irradiated infrared rays is observed, the observed light is considered to have transmitted the skin surface before being irregularly reflected by the living tissue underneath, the reflected light containing predominantly the diffuse reflection component.

Figure 12:
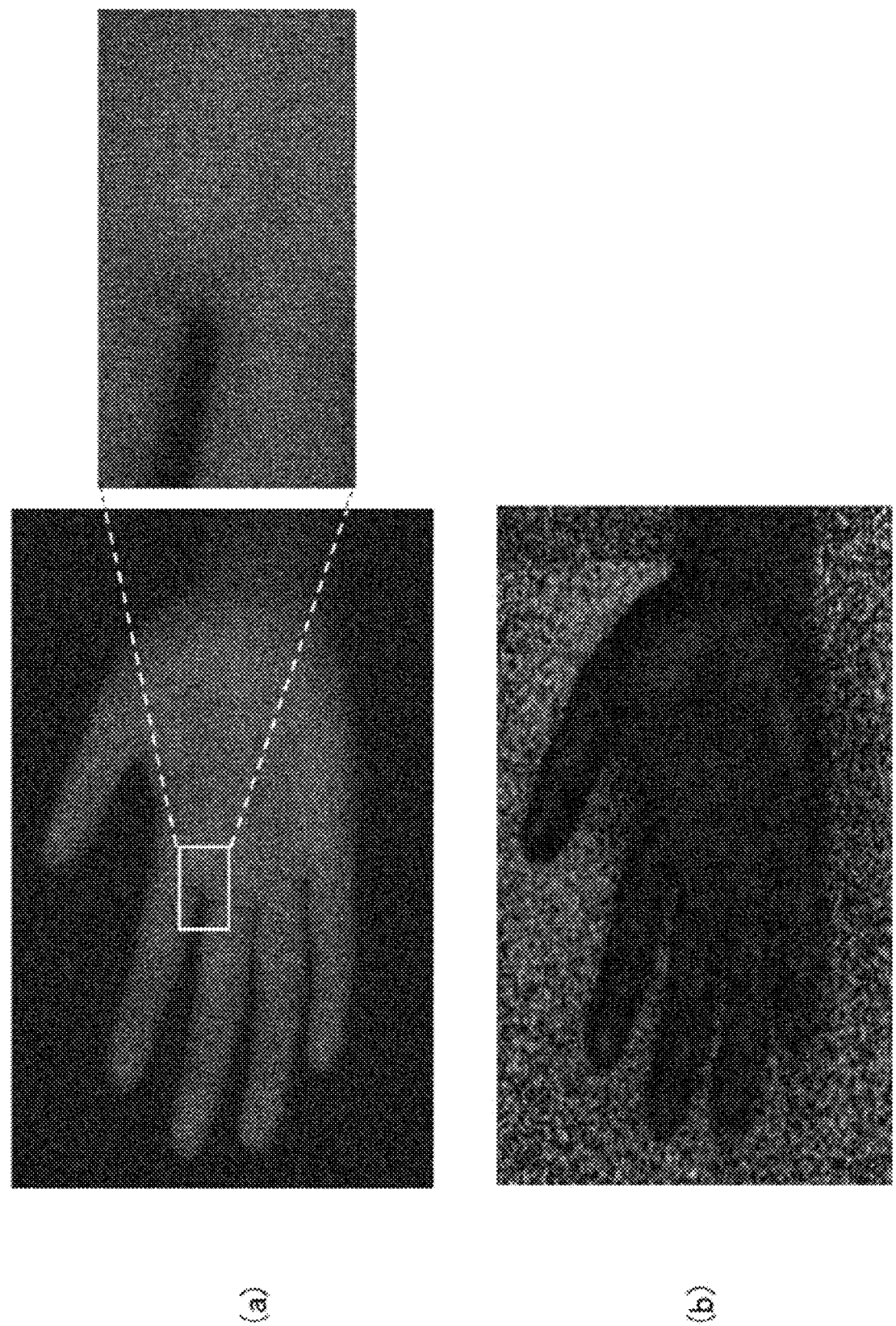
FIG. 12 is a schematic diagram depicting images captured of a human hand under infrared irradiation in the embodiment.

FIG. 12 depicts images captured of a human hand under infrared irradiation. The infrared rays here have a wavelength of 850 nm and fall in a near-infrared domain. A luminance image in Subfigure (a) indicates a high luminance value in the region of the hand while allowing blood vessels to be recognized by reflected light from inside the hand. A polarization degree image in Subfigure (b) indicates that the pixel value is uniformly small and the polarization degree is low in the hand region compared with a background region. That is, a low polarization degree is seen to enable a distinction from the background region. Because such differences in polarization degree are dependent on how easily light is absorbed by the surface, an image of the hand is extracted reliably even where the hand is difficult to distinguish in the luminance image due to the lighting conditions.

FIG. 13 depicts polarization degree images generated from polarized images captured over a wide field of view. In the case where a person as a subject does not hold anything in his or her hand, the polarization degree in the region of the hand is uniformly low compared with images of other subjects in the surroundings. The uniformly low polarization degree permits accurate extraction of the hand's image as in the case of FIG. 12. Even where the hand is holding a beverage bottle or similar object as depicted in Subfigures (b) and (c), an image of the bottle alone presents a high polarization degree, which enables an accurate distinction from the image of the hand.

In this manner, the beverage bottle image alone, for example, may be cut out and replaced with another image or may be recognized as something being held by the person's hand. In particular, in the case of implementing an augmented reality in which a person manipulates a virtual object by hand, it is important to be able to identify the region of the hand image as distinct from the other regions. Since the hand is highly likely to be generally exposed, it is an easy object to be identified by this embodiment having recourse to the absorption of infrared rays and to polarization degrees. Still, as discussed above, objects of other materials can also be identified likewise with accuracy by use of the light in wavelength bands readily absorbed by the target object.

Figure 14:
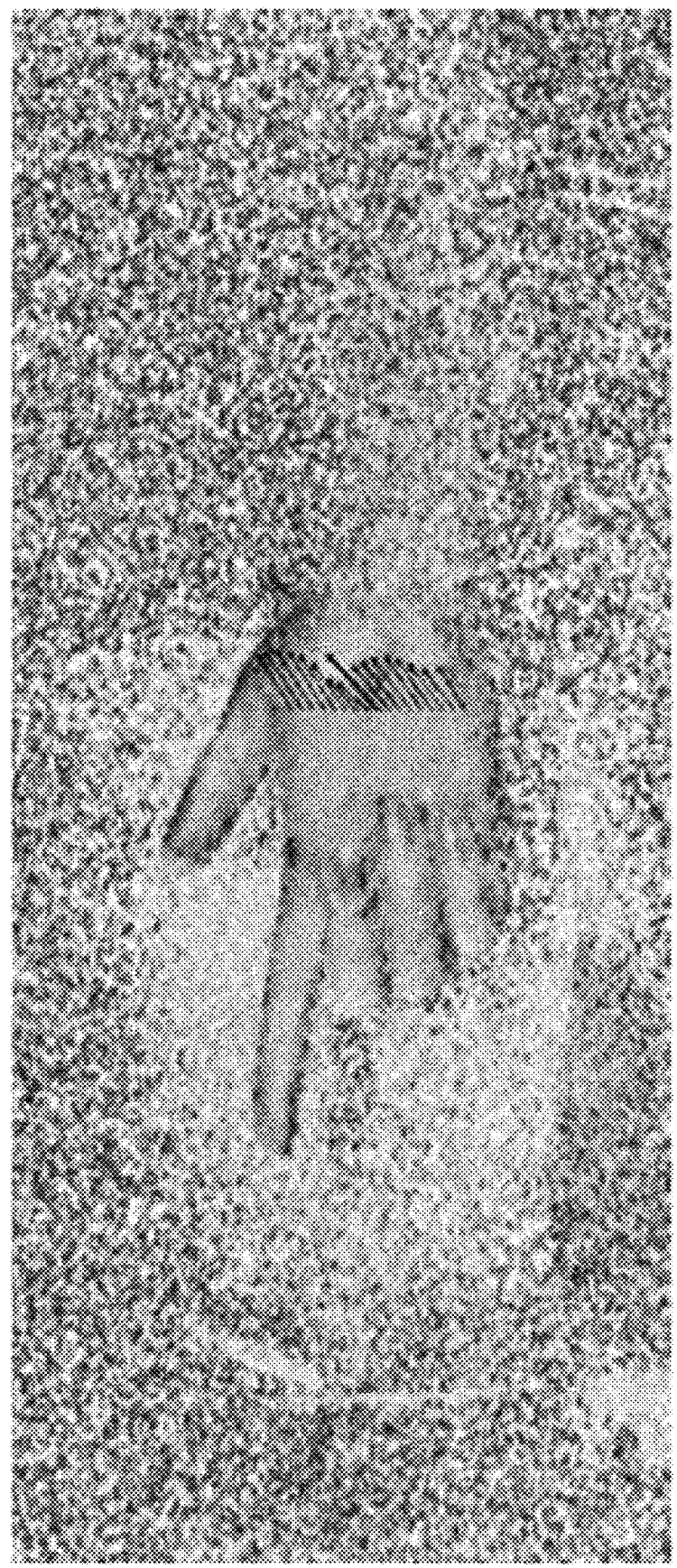
FIG. 14 is a schematic diagram depicting a normal line image indicating normal vectors in terms of pixel values, the normal vectors having been calculated from a polarized image in four bearings in the embodiment.

FIG. 14 depicts a normal line image indicating normal vectors in terms of pixel values in the hand image region depicted in Subfigure (a) of FIG. 13, the normal vectors having been calculated from polarized images in four bearings. Whereas normal vector calculation is performed by the output data generation section 56, the normal vectors are efficiently calculated if the calculation target is limited to the hand image region extracted by the reference light image usage section 60 in the material identification section 54. As indicated by a distribution of arrows in FIG. 14, normal lines to the palm of the hand are seen precisely derived. This makes it possible to implement the above-mentioned augmented reality or enable the recognition of gestures by hand with precision.

The reference light image usage section 60 makes use of captured images under infrared irradiation. The recourse to such images may be combined with the TOF technique by which the distance to a subject is measured from the time period that elapses from the time infrared rays are irradiated until reflected light thereof is detected. In the case where the subject is translucent, the transmitted light diffused and reflected by the inside of the subject is observed later than the light reflected by the surface of the subject. The situation can lead to the measured distance being longer than actually is. Techniques making use of this characteristic have been proposed to categorize the materials of subjects based on the distortion of measured distances (see "Categorizing translucent objects based on the measurement distortion of a distance meter of a ToF camera," Iwaguchi et al., Research Report on Computer Vision and Image Media, 2016, CVIM-203, Vol 12, P. 1-7).

The above-cited technique takes advantage of the fact that the intensity of internal diffusion of light varies depending on the subject material and that the distortion of distance measurements is also dependent on the material. When polarized images are captured in the same situation for polarization degree evaluation, the polarization degree varies depending on the material under the same principles. In the example depicted in FIG. 13, the regions of the beverage bottle have a particular polarization degree each. Thus, instead of setting a single threshold value for polarization degrees and thereby extracting the region of a person's skin, a presumed range of polarization degrees may be associated with each of the materials to permit categorization of the subject materials. It is also possible to categorize the materials based simultaneously on the distortion of measurements by a TOF camera and on the polarization degrees, which improves the accuracy of material identification.

Furthermore, from the distance image generated by TOF, the regions having errors due to the absorption of infrared rays can be determined for their low polarization degrees. For example, a region whose polarization degree is equal to or lower than a predetermined value is assumed to correspond to a subject surface that absorbs infrared rays. The output data generation section 56 then makes correction to reduce by a predetermined rate the distance value obtained relative to that region. Because both polarization degree and the error of distance value are affected by the rate of absorption of infrared rays, the correlations between the polarization degrees and the errors may be acquired beforehand. The distance value may then be corrected more accurately on the basis of the polarization degrees. That is, the output data generation section 56 changes the ratio by which to reduce the distance value in accordance with the range of polarization degrees presented by the image of interest.

Figure 15:
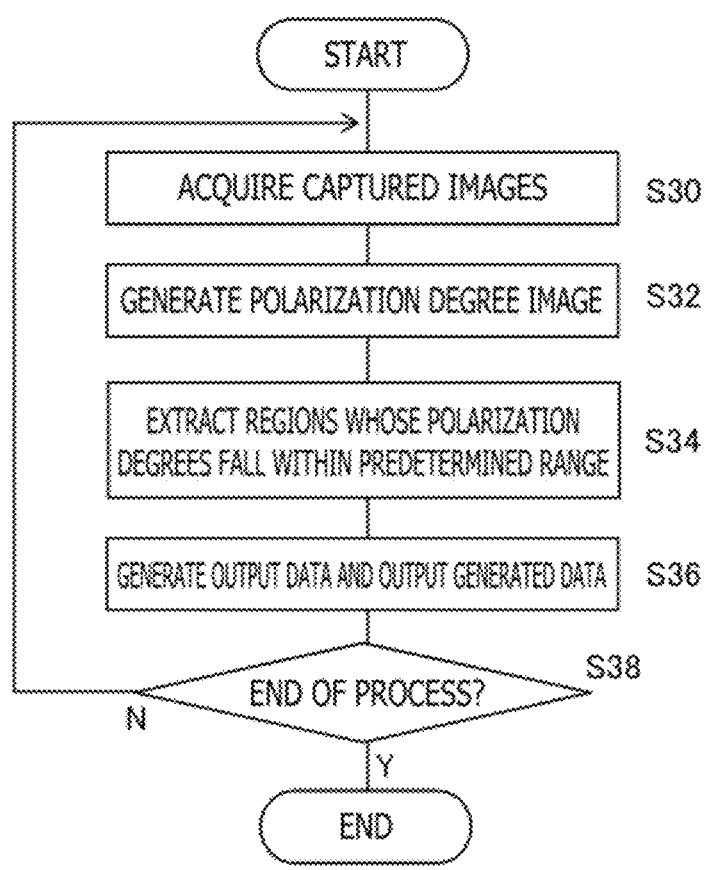
FIG. 15 is a flowchart of processing steps performed by a reference light image usage section in the material identification section of the information processing apparatus of the embodiment, to identify a material, generate output data based on the result of the identification, and output the generated data.

FIG. 15 is a flowchart of processing steps performed by the reference light image usage section 60 in the material identification section 54 of the information processing apparatus 10, to identify a material, generate output data based on the result of the identification, and output the generated data. The process of the flowchart is started when the user requests the information processing apparatus 10 to start processing and the imaging apparatus 12 starts to capture a target object in response to the request.

The captured image acquisition section 50 first acquires the data of captured images from the imaging apparatus 12 and stores the data into the image data storage section 52 (S30). This step is performed in a manner similar to that of S10 in FIG. 10. It is to be noted, however, that at least the polarized images are those captured under irradiation of reference light in a predetermined wavelength band such as infrared rays. Then the reference light image usage section 60 calculates the polarization degree for each of the pixels using the polarized images in four bearings, and generates a polarization degree image using the calculated polarization degrees as its pixel values (S32).

The reference light image usage section 60 then extracts a region having a predetermined range of polarization degrees from the polarization degree image as an image of the target object having a predetermined material (S34). For example, in the case of a hand, the region whose polarization degree is lower than a predetermined threshold value is extracted. Where images of two or more target objects of different materials are to be identified, the regions each indicative of a range of polarization degrees set for each of the materials are extracted. The extracted regions may be subjected to pattern matching, for example, so as to exclude from the extracted result the images clearly different from those of the target object.

The output data generation section 56 then performs predetermined processing on the basis of the obtained material, generates output data such as display image data and audio data, and outputs the generated data to the display apparatus 16 (S36). This step may be performed in a manner similar to that of S22 in FIG. 10. However, a process may be included here to finalize the image of the subject having the predetermined material by correcting the distance value measured by TOF and by integrating the material estimated by TOF with the result of the step of S34, as discussed above. During the time period in which there is no need to stop the process by means of, for example, a user operation (N in S38), the steps of S30 to S36 are repeated on subsequent image frames. If it becomes necessary to stop the process by means of the user operation, for example, the entire process is terminated (Y in S38).

Figure 16:
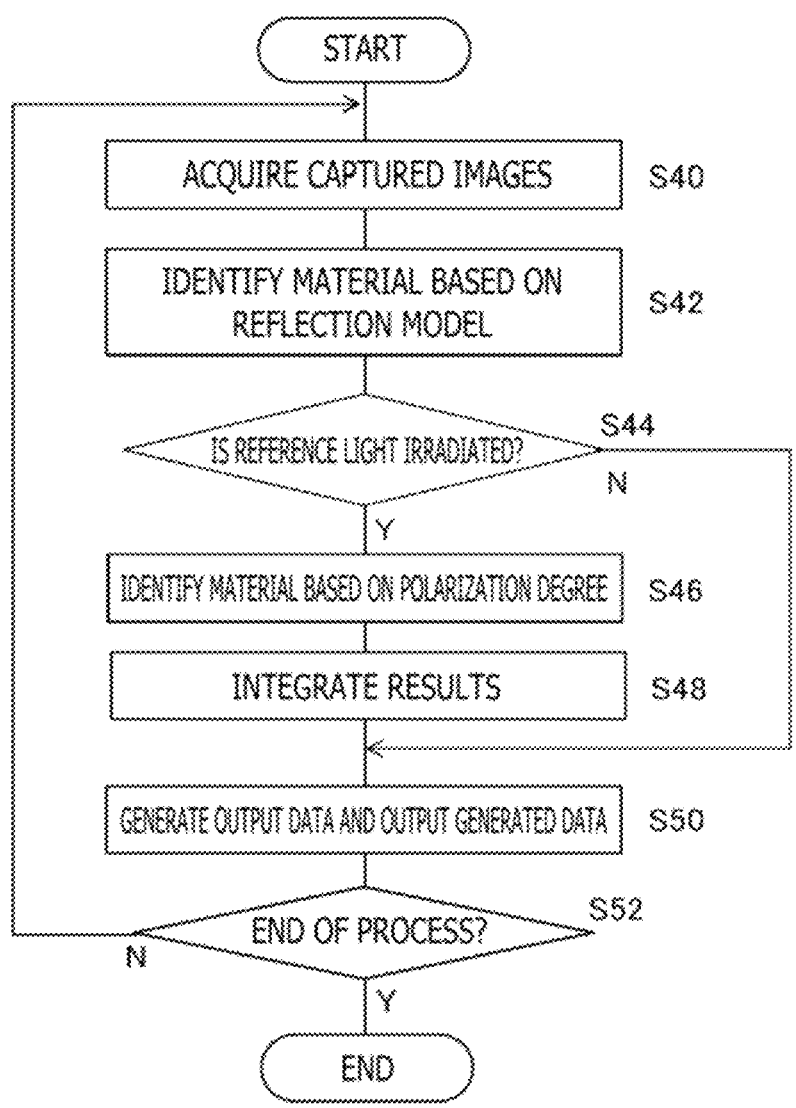
FIG. 16 is a flowchart of processing steps performed by both the reflection model usage section and the reference light image usage section in the material identification section of the information processing apparatus of the embodiment, to identify a material, generate output data based on the result of the identification, and output the generated data.

FIG. 16 is a flowchart of processing steps performed by both the reflection model usage section 58 and the reference light image usage section 60 in the material identification section 54 of the information processing apparatus 10, to identify a material, generate output data based on the result of the identification, and output the generated data. The process of the flowchart is started when the user requests the information processing apparatus 10 to start processing and the imaging apparatus 12 starts to capture a target object in response to the request.

The captured image acquisition section 50 first acquires the data of captured images from the imaging apparatus 12 and stores the data into the image data storage section 52 (S40). This step is performed in a manner similar to that of S10 in FIG. 10. However, in this case, the captured image acquisition section 50 requests the imaging apparatus 12 to start and stop reference light irradiation at a predetermined timing. It follows that some of the images have been captured under reference light irradiation and the others have been captured otherwise. The captured image acquisition section 50 distinguishes the two types of images by referencing data added to the captured images transmitted from the imaging apparatus 12, the added data making a distinction between the two image types, before storing the images into the image data storage section 52. Incidentally, also in the processing steps indicated in FIG. 15, the imaging apparatus 12 may irradiate reference light only for a short period in response to requests from the captured image acquisition section 50. During the period of the irradiation, downstream processing may be carried out.

Next, the reflection model usage section 58 in the material identification section 54 identifies the material of the subject originating the image by applying the reference model to the captured images (S42). More specifically, this step is performed in a manner similar to that of the steps of S12 to S20 in FIG. 10. If the obtained image is not the one captured under reference light irradiation (N in S44), the output data generation section 56 performs predetermined processing based on the acquired material, generates output data such as display image data and audio data, and outputs the generated data to the display apparatus 16 (S50). This step may also be performed in a manner similar to that of S22 in FIG. 10.

During the time period in which there is no need to stop the process by means of, for example, a user operation (N in S52), the steps of S40, S42, and S50 are repeated on subsequent image frames. Basically, this loop is performed continuously. When reference light is irradiated at a predetermined timing (Y in S44), the reference light image usage section 60 in the material identification section 54 identifies the image of the subject having the predetermined material on the basis of the polarization degree obtained from the polarized image (S46). Here, the timing for starting reference light irradiation may be at intervals of a predetermined time period or at the time the predetermined material such as the human skin is identified in S42.

The reference light image usage section 60 integrates the result it identified in S46 with the result identified by the reflection model usage section 58 in S42 (S48). Here, the step performed by the reference light image usage section 60 has the role of correcting the result of material identification by the reflection model usage section 58 and of improving the accuracy of the processes of material identification by the reflection model usage section 58 on subsequent frames. For example, the region extracted in S42 as an image of the hand is compared with the result of the polarization degree detected under reference light irradiation to determine whether or not the region is a true image of the hand. If the region is determined to be something other than a true image of the hand, that region is excluded from the result. If the region identified in S42 turns out to have a positional displacement, the region having its displacement corrected is presented as the final result.

Furthermore, information regarding the region identified in S46 may be output to the reflection model usage section 58. This provides an approximate position of an image of the specific target object such as a human hand, enabling the reflection model usage section 58 to limit the processing target to the region and efficiently identify the material based on the reflection model. When irradiation of reference light is performed only temporarily and terminated after a predetermined short time period, the accuracy of material identification is improved with little increase in power consumption. If it becomes necessary to stop the process by means of the user operation, for example, the entire process is terminated (Y in S52).

According to the above-described embodiment of the present invention, the material of the subject found in the captured image is identified using at least either the reflection model or the polarization degree under reference light irradiation. In the case of resorting to the reflection model, the material is identified which corresponds to the reflection characteristic acquired by solving the inverse problem of the rendering equation through the use of the luminance of the captured image, the position and posture of the subject in the target space from stereoscopic images, the position and posture of the imaging plane relative to those of the subject, and the position of the light source. In this case, the determination based on the polarization degree threshold value is carried out to make a distinction between the image of the light source and the image of the reflected light from the light source in the captured image.

In this manner, the rendering equation is accurately set up without falsely recognizing the position of the light source image. The material of the subject is thus identified with high accuracy. When the luminance value acquired by the rendering equation is regarded as the luminance of the polarized image and compared with the actually obtained polarized images in multiple bearings, the material is identified using more parameters than if the luminance of natural light is utilized. This further improves the identification accuracy.

The reference light in a wavelength band easily absorbed by a specific material is irradiated to the target space, and the polarization degrees in the target space are subjected to the threshold-based determination, thereby identifying an image of the subject having the specific material. This technique involves allowing the light temporarily absorbed by the surface to be diffused inside in order to intentionally create a situation where diffuse reflection is predominant. The technique is highly robust in the face of an adverse target space environment in terms of illuminance and light source presence. This process makes it possible independently to identify the image of the target object of a predetermined material with high accuracy. When combined with the above-described process of material identification based on the reflection model, the process improve the efficiency of material identification and further boosts the accuracy thereof. As a result, identification of the material permits accurate extraction of the image of the target object and precise recognition of the object in the field of view. It is also possible accurately to derive the state of the target object and to perform information processing using the derived state of the target object.

The present invention has been described above in conjunction with a specific embodiment. It is to be understood by those skilled in the art that suitable combinations of the constituent elements and of various processes of the embodiment described above as examples will lead to further variations of the present invention and that such variations also fall within the scope of this invention.

REFERENCE SIGNS LIST

10 Information processing apparatus, 12 Imaging apparatus, 16 Display apparatus, 23 CPU, 24 GPU, 26 Main memory, 50 Captured image acquisition section, 52 Image data storage section, 54 Material identification section, 56 Output data generation section, 58 Reflection model usage section, 60 Reference light image usage section, 62 Space information acquisition section, 64 Light source position identification section, 66 Material identification section, 68 Material model storage section, 70 Natural light image acquisition section, 72 Polarized image acquisition section, 74 Reference light irradiation section, 78 Communication section

INDUSTRIAL APPLICABILITY

The present invention, as described above, may be applied to diverse types of information processing apparatuses such as game devices, mobile terminals, personal computers, robots, and inspection apparatuses, as well systems that include the information processing apparatuses.

The invention claimed is:

1. An information processing apparatus comprising:
a captured image acquisition section configured to acquire data of a polarized image captured of polarized light in a plurality of bearings, the polarized image being formed by reflection of reference light in a wavelength band irradiated to a subject, the wavelength band being selected on a basis of a predetermined material,
wherein the reference light is an irradiation source controlled by the information processing apparatus;
a material identification section configured to acquire a distribution of polarization degrees based on the polarized image so as to identify an image of the subject having the predetermined material on a basis of a range of the distribution; and
an output data generation section configured to output data representing the identified image.

2. The information processing apparatus according to claim 1,
wherein the captured image acquisition section acquires the polarized image of infrared rays,
wherein the reference light is an infrared light source for outputting the infrared rays, and
the material identification section identifies a region of which the polarization degree is lower than a predetermined threshold value as an image of a portion of an exposed human skin.

3. The information processing apparatus according to claim 1,
wherein the captured image acquisition section further acquires data of an image captured during a time period in which the reference light is not irradiated by the information processing apparatus, and
the material identification section corrects information regarding an image of the subject separately identified using the captured image, on a basis of information regarding the image of the subject identified on a basis of the polarized image formed by reflection of the reference light.

4. The information processing apparatus according to claim 3,
wherein, when the material identification section detects an image of the subject having the predetermined material using the image captured during the time period in which the reference light was not irradiated, the captured image acquisition section requests an imaging apparatus to irradiate the reference light.

5. The information processing apparatus according to claim 1,
wherein the captured image acquisition section further acquires data of a distance image representing a distance to the subject when the reference light is not activated;
wherein the distance image is acquired through calculations based on a time period that elapses from a time the reference light is irradiated until detection of reflected light thereof is received, and
the output data generation section adjusts a distance value of the subject in the distance image by a predetermined ration depending upon the detected material of the subject.

6. The information processing apparatus according to claim 5,
wherein the output data generation section varies the ratio depending on range of the polarization degrees in the distance image.

7. An information processing system comprising:
the information processing apparatus including
a captured image acquisition section configured to acquire data of a polarized image captured of polarized light in a plurality of bearings, the polarized image being formed by reflection of reference light in a wavelength band irradiated to a subject, the wavelength band being selected on a basis of a predetermined material;
wherein the reference light is an irradiation source controlled by the information processing system,
a material identification section configured to acquire a distribution of polarization degrees based on the polarized image so as to identify an image of the subject having the predetermined material on a basis of a range of the distribution, and
an output data generation section configured to output data representing the identified image; and
an imaging apparatus configured to irradiate the reference light in response to a request from the information processing apparatus and transmit to the information processing apparatus the data of captured images together with information added to make a distinction between a time period during which the reference light is irradiated and all other periods.

8. A material identification method by an information processing apparatus, the method comprising:
acquiring data of a polarized image captured of polarized light in a plurality of bearings, the polarized image being formed by reflection of reference light in a wavelength band irradiated to a subject, the wavelength band being selected on a basis of a predetermined material, wherein the reference light is an irradiation source controlled by the information processing apparatus;

acquiring a distribution of polarization degrees based on the polarized image so as to identify an image of the subject having the predetermined material on a basis of a range of the distribution; and outputting data representing the identified image.

9. A non-transitory computer readable medium having stored thereon a computer program for a computer, the computer program comprising:

by a captured image acquisition section, acquiring data of a polarized image captured of polarized light in a plurality of bearings, the polarized image being formed by reflection of reference light in a wavelength band irradiated to a subject, the wavelength band being selected on a basis of a predetermined material, wherein the reference light is an irradiation source controlled by the information processing apparatus;

by a material identification section, acquiring a distribution of polarization degrees based on the polarized image so as to identify an image of the subject having the predetermined material on a basis of a range of the distribution; and by an output data generation section, outputting data representing the identified image.

* * * * *